United States Patent
Tsuji et al.

(10) Patent No.: US 10,266,066 B2
(45) Date of Patent: Apr. 23, 2019

(54) STRADDLED ELECTRIC VEHICLE, AND CHARGING SYSTEM FOR STRADDLED ELECTRIC VEHICLE

(71) Applicant: YAMAHA HATSUDOKI KABUSHIKI KAISHA, Iwata-shi, Shizuoka (JP)

(72) Inventors: Shinji Tsuji, Shizuoka (JP); Masakazu Takano, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 94 days.

(21) Appl. No.: 15/139,358

(22) Filed: Apr. 27, 2016

(65) Prior Publication Data

US 2017/0021739 A1 Jan. 26, 2017

(30) Foreign Application Priority Data

Apr. 30, 2015 (JP) ................................. 2015-093315

(51) Int. Cl.
*H02J 7/00* (2006.01)
*H02J 7/14* (2006.01)
(Continued)

(52) U.S. Cl.
CPC ....... *B60L 11/1868* (2013.01); *B60L 11/1816* (2013.01); *B60L 11/1822* (2013.01); *B60L 11/1879* (2013.01); *B62K 11/04* (2013.01); *B62K 19/30* (2013.01); *H01M 2/1077* (2013.01); *H01M 2/1083* (2013.01);
(Continued)

(58) Field of Classification Search
USPC ........ 320/134, 109, 116, 122, 112, 135, 119, 320/132, 149
See application file for complete search history.

(56) References Cited

U.S. PATENT DOCUMENTS 6,741,065 B1 * 5/2004 Ishii .................... B60L 11/1816
320/122
8,820,444 B2 * 9/2014 Nguyen .............. B60L 11/1822
180/65.1
(Continued)

FOREIGN PATENT DOCUMENTS

DE  10 2009 046 967 A1   5/2011
EP       2 386 474 A1   11/2011
(Continued)

OTHER PUBLICATIONS

Official Communication issued in corresponding European Patent Application 16167065.8, dated Mar. 28, 2017.

*Primary Examiner* — Alexis B Pacheco
(74) *Attorney, Agent, or Firm* — Keating and Bennett, LLP

(57) ABSTRACT

In an electric vehicle, two or more batteries are able to be independently mountable on and demountable from the vehicle body. Power received from a first charger via an inlet is supplied to the two batteries via a power line. Each of the two batteries includes a connector for connection to a second charger when the batteries are demounted from the vehicle body, and a controller that controls charging of the battery by the second charger such that it is possible to facilitate charging of a battery when the battery is demounted from the vehicle body and when the battery is mounted on the vehicle body.

17 Claims, 19 Drawing Sheets

(51) Int. Cl.
  *B60L 11/18* (2006.01)
  *B62K 11/04* (2006.01)
  *B62K 19/30* (2006.01)
  *H01M 2/10* (2006.01)
  *H01M 10/42* (2006.01)
  *H01M 10/44* (2006.01)

(52) U.S. Cl.
  CPC ....... *H01M 10/425* (2013.01); *H01M 10/441* (2013.01); *H02J 7/0013* (2013.01); *H02J 7/0027* (2013.01); *B60L 2200/12* (2013.01); *B62K 2204/00* (2013.01); *B62K 2208/00* (2013.01); *H01M 2220/20* (2013.01); *H02J 2007/0098* (2013.01); *Y02T 10/7055* (2013.01)

(56) References Cited

U.S. PATENT DOCUMENTS

| | | | |
|---|---|---|---|
| 2004/0031632 A1* | 2/2004 | Kohda | B60K 1/04 180/68.5 |
| 2009/0212738 A1* | 8/2009 | Coonan | H02J 7/0027 320/113 |
| 2010/0018787 A1 | 1/2010 | Plazotta et al. | |
| 2011/0056177 A1* | 3/2011 | Goto | B62M 6/55 56/14.7 |
| 2011/0295454 A1* | 12/2011 | Meyers | B62J 17/00 701/22 |
| 2012/0103716 A1* | 5/2012 | Fujihara | B60L 11/1877 180/220 |
| 2013/0096762 A1* | 4/2013 | Houchin-Miller | B60L 11/1864 701/22 |
| 2013/0216885 A1* | 8/2013 | Kawatani | H01M 2/1083 429/100 |
| 2013/0280572 A1* | 10/2013 | Kawatani | H01M 2/1083 429/100 |
| 2014/0145681 A1* | 5/2014 | Vuorilehto | H02J 7/0016 320/134 |
| 2014/0262568 A1* | 9/2014 | Matsuda | B62K 11/04 180/65.1 |
| 2014/0365792 A1* | 12/2014 | Yun | G06F 1/3212 713/320 |
| 2015/0123611 A1* | 5/2015 | Huang | B60L 11/1822 320/109 |
| 2015/0266535 A1* | 9/2015 | Marioni | B60K 1/00 180/220 |
| 2015/0286198 A1* | 10/2015 | Sugeno | H04Q 9/00 700/295 |
| 2016/0164662 A1* | 6/2016 | Kang | H04L 29/02 375/356 |
| 2016/0190830 A1* | 6/2016 | Kuhlmann | H02J 7/0026 320/116 |

FOREIGN PATENT DOCUMENTS

| | | |
|---|---|---|
| EP | 2 623 404 A1 | 8/2013 |
| FR | 582 287 A | 12/1924 |
| GB | 2 446 229 A | 8/2008 |
| JP | 2001-045673 A | 2/2001 |
| JP | 2003-116226 A | 4/2003 |
| JP | 2005-104249 A | 4/2005 |
| JP | 2010-018270 A | 1/2010 |
| JP | 2011-079510 A | 4/2011 |

* cited by examiner

STRADDLED ELECTRIC VEHICLE, AND CHARGING SYSTEM FOR STRADDLED ELECTRIC VEHICLE

BACKGROUND OF THE INVENTION

1. Field of the Invention

The present invention relates to a technology for charging a battery mounted in a straddled electric vehicle.

2. Description of the Related Art

Japanese Patent Laid-open Publication No. 2010-018270 discloses an electric motorcycle that uses an electric motor as a power source. The electric motorcycle has a battery capable of being demounted from the vehicle body. The battery demounted from the vehicle body can be charged by a charger connected to a household power source or the like. Japanese Patent Laid-open Publication No. 2005-104249 discloses a motor-assisted bicycle that assists a drive of the rear wheel with an electric motor. A battery of the bicycle can be charged in either of the states of being demounted from the vehicle body and of being mounted on the vehicle body.

In some cases, a battery of an electric motorcycle needs to be charged with a public charging station when a user travels far on the electric motorcycle. In those cases, it is convenient for the user that the battery can be charged in a state in which the battery is mounted on the vehicle body. In this view, it is desirable that a battery of an electric motorcycle is chargeable in either of the states of being demounted from the vehicle body and of being mounted on the vehicle body, similar to the motor-assisted bicycle disclosed in Japanese Patent Laid-open Publication No. 2010-018270. In order to ensure a longer travel range of an electric motorcycle or to increase output of the electric motor, it is necessary to increase the capacity of a battery or an output voltage of the same. Increasing the capacity and increasing the output voltage of a battery will invite an increase in the weight of the battery. This makes it difficult for the user to demount the battery from the vehicle body to charge and to carry the demounted battery to a place of a charger.

SUMMARY OF THE INVENTION

Preferred embodiments of the present invention provide a straddled electric vehicle and a charging system for the straddled electric vehicle which facilitates charging of a battery demounted from the straddled electric vehicle and enables users to charge the battery mounted on the straddled electric vehicle.

(1) A straddled electric vehicle according to a preferred embodiment of the present invention includes a first battery mountable on and demountable from a vehicle body; a second battery mountable on and demountable from the vehicle body independently of the first battery; an electric motor that is driven by power from the first battery and the second battery and supplies a drive force to a driving wheel; an inlet provided to the vehicle body and capable of being connected to a first charger installed outside; and a power line to charge both of the first battery and the second battery with power supplied via the inlet in a state in which the first battery and the second battery are mounted on the vehicle body. The first battery includes a connector that is capable of being connected to a second charger in a state in which the first battery is demounted from the vehicle body, and a controller configured or programmed to control charging by the second charger. The second battery includes a connector capable of being connected to the second charger in a state in which the second battery is demounted from the vehicle body, and a controller configured or programmed to control charging by the second charger.

The plurality of batteries are able to be individually demounted from the vehicle body. Each battery includes a controller configured or programmed to control charging. This makes it possible to charge the battery in the state of being demounted from the vehicle body, and also to facilitate the work of charging. Further, it is possible to charge the plurality of batteries in the state of being mounted on the vehicle body.

In a straddled electric vehicle according to a preferred embodiment of the present invention, one of the first battery and the second battery may work as a master battery that communicates with the first charging device, based on information on a state of the one battery and information on a state of another battery, when being mounted on the vehicle body, and the other of the first battery and the second battery may work as a slave battery that sends the information on the state of the other battery to the master battery when being mounted on the vehicle body. With the above, the first battery and the second battery can be regarded as a single battery when viewed from the first charger, and thus a particular process for two batteries is not necessary in the first charger.

In a straddled electric vehicle according to a preferred embodiment of the present invention, the master battery sends a request received from the first charger to the slave battery. This eliminates a need of a direct communication between the slave battery and the first charger.

In a straddled electric vehicle according to a preferred embodiment of the present invention, one of the first battery and the second battery may work as a master battery that integrates information on a state of the one battery and information on a state of the other battery and sends information obtained by integration to a controller of the vehicle, when being mounted on the vehicle body, and the other of the first battery and the second battery may work as a slave battery to send the information on the state of the other battery to the master battery, when being mounted on the vehicle. With the above, the first battery and the second battery can be regarded as a single battery when viewed from the controller of the vehicle, and thus a particular process for two batteries is not necessary in the controller of the vehicle.

In a straddled electric vehicle according to a preferred embodiment of the present invention, the master battery may send a request received from the controller of the vehicle to the slave battery. This eliminates the need for direct communication between the slave battery and the first charger.

In a straddled electric vehicle according to a preferred embodiment of the present invention, each of the battery controller of the first battery and the battery controller of the second battery may be capable of working as the master battery. With the above, a user does not need to manage which of the first battery and the second battery is a master battery when the battery is demounted from the vehicle body.

In a straddled electric vehicle according to a preferred embodiment of the present invention, the first battery and the second battery may supply power to the electric motor when being serially connected to each other.

In a straddled electric vehicle according to a preferred embodiment of the present invention, the first battery and the second battery may supply power to the electric motor when being connected in parallel to each other.

In a straddled electric vehicle according to a preferred embodiment of the present invention, the first battery and the second battery may be serially connected to each other to be charged.

In a straddled electric vehicle according to a preferred embodiment of the present invention, the first battery and the second battery may be connected in parallel to each other to be charged.

In a straddled electric vehicle according to a preferred embodiment of the present invention, at least one of the first battery and the second battery may select a battery to be charged, based on information on a state of the first battery and information on a state of the second battery. For example, it is possible to select and charge only a battery with a lower remaining battery power.

In a straddled electric vehicle according to a preferred embodiment of the present invention, the inlet may include four terminals respectively connected to a positive electrode of the first battery, a negative electrode of the first battery, a positive electrode of the second battery, and a negative electrode of the second battery. With the above, it is possible to change the connection (parallel connection or serial connection) between two batteries by changing the connection among the terminals provided to the inlet.

In a straddled electric vehicle according to a preferred embodiment of the present invention, the inlet may include a cover removable from the inlet, and the cover may include either a line to serially connect the first battery and the second battery or a line to connect the first battery and the second battery in parallel.

A charging system according to a preferred embodiment of the present invention includes a straddled electric vehicle according to a preferred embodiment of the present invention; and one of the first charger and the second charger. With the above, it is possible to demount each of the plurality of batteries individually from the vehicle body. Further, each battery includes a controller configured or programmed to control charging. Therefore, it is possible to charge a battery in the state of being demounted from the vehicle body, and to facilitate the work of charging. Further, it is possible to charge the plurality of batteries in the state of being mounted on the vehicle body.

In a charging system according to a preferred embodiment of the present invention, the inlet may include four terminals respectively connected to a positive electrode of the first battery, a negative electrode of the first battery, a positive electrode of the second battery, and a negative electrode of the second battery, the first charger may include a charging plug for connection to the inlet of the straddled electric vehicle, and the charging plug may include either a line to serially connect the first battery and the second battery or a line to connect the first battery and the second battery in parallel. With the above, it is possible to change the connection (parallel connection or serial connection) between the first battery and the second battery, depending on the capability of the first charger or the like.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
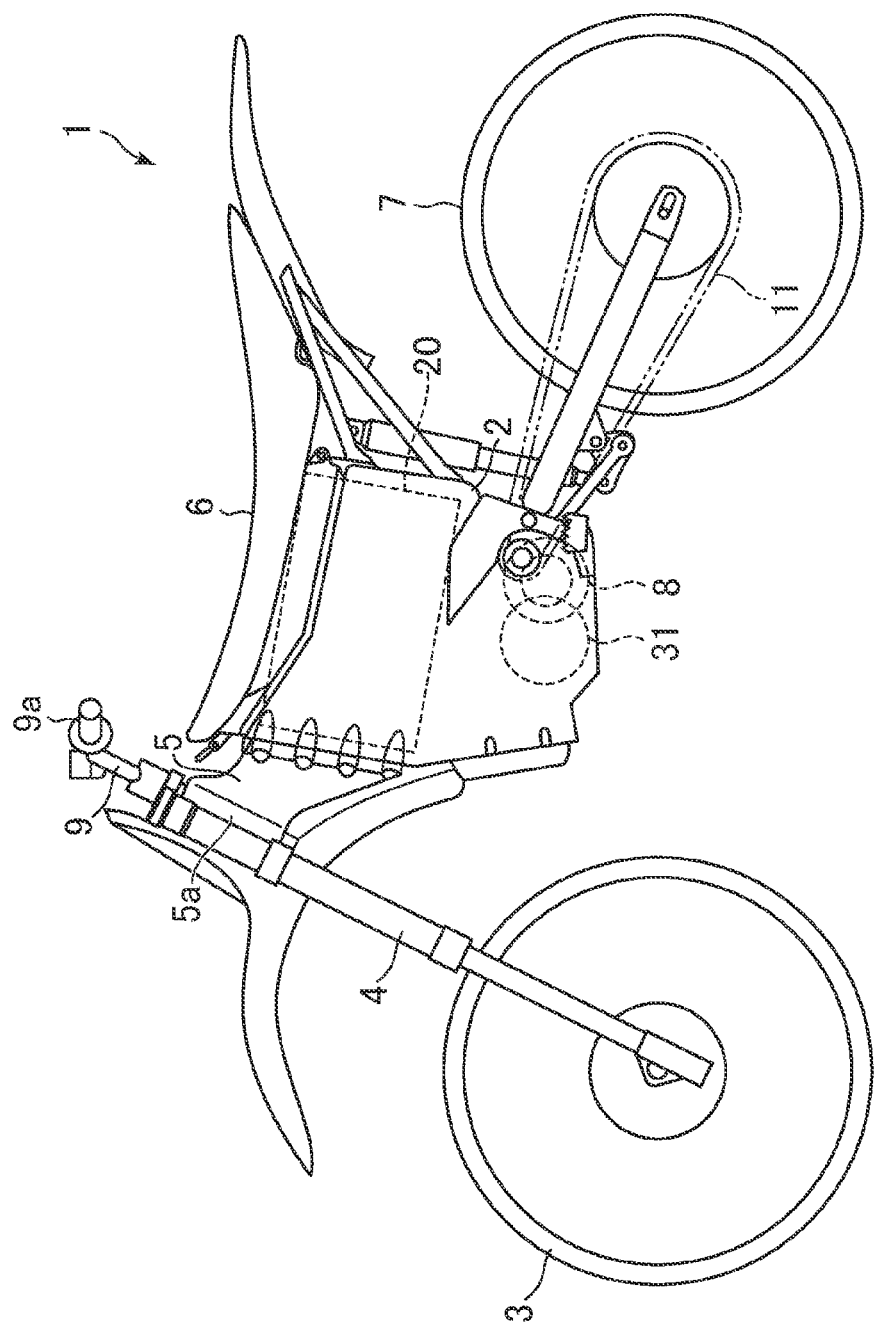
FIG. 1 is a side view of an electric motorcycle according to a preferred embodiment of the present invention.
Figure 2:
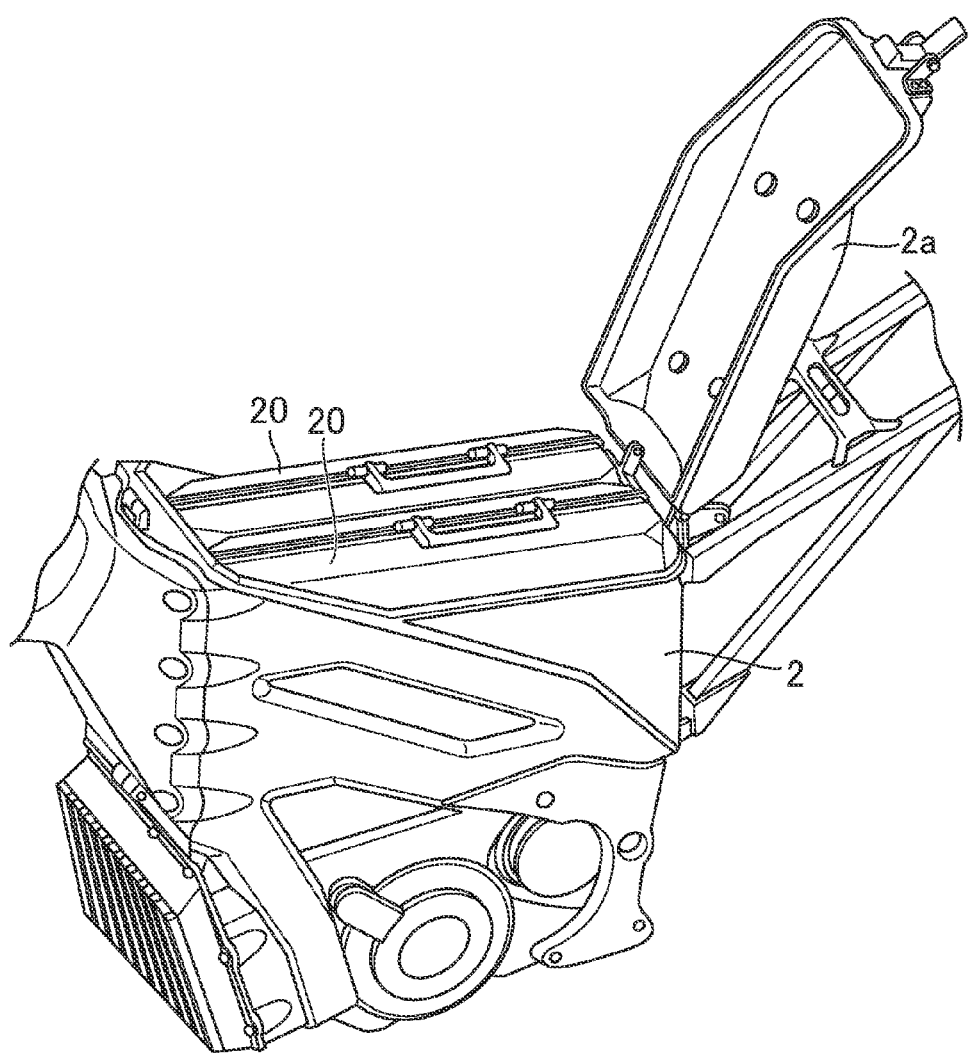
FIG. 2 is a perspective view showing an example of a battery case of the electric motorcycle shown in FIG. 1.
Figure 3:
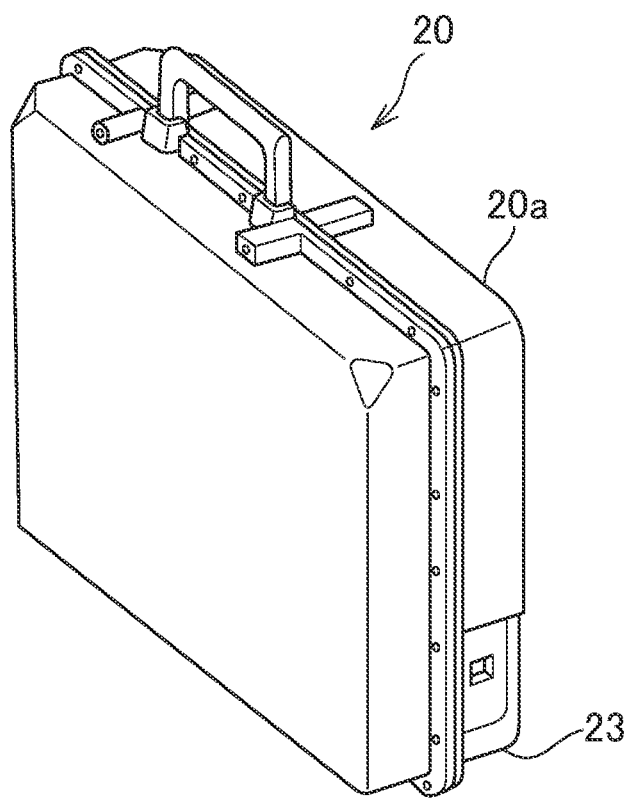
FIG. 3 is a perspective view of a battery provided on the motorcycle shown in FIG. 1.

In the following, straddled electric vehicles according to preferred embodiment of the present invention will be described. In the following, an electric motorcycle 1 will be described as an example of a straddled vehicle. FIG. 1 is aside view of the electric motorcycle 1. FIG. 2 is a perspective view showing an example of a battery case 2 equipped to the electric motorcycle 1. FIG. 3 is a perspective view of a battery 20 equipped to the electric motorcycle 1.

As shown in FIG. 1, a front wheel 3 of the electric motorcycle 1 is supported by the lower end portion of a front fork 4. The front fork 4 is turnable in the left and right direction around a steering shaft. The steering shaft is supported on a head pipe 5a located at the front end of a vehicle body frame 5. A steering handle 9 is fixed on the upper portion of the front fork 4. The steering handle 9 includes grips 9a each provided on each of the right and left sides thereof. The grip 9a on the right side works as an accelerator grip.

As shown in FIG. 2, the electric motorcycle 1 includes a plurality of batteries 20. The plurality of batteries 20 are individually removable from the vehicle body. That is, one battery 20 is able to be demounted from and mounted on the vehicle body independently of other batteries 20. As shown in FIG. 3, each battery 20 includes a housing 20a storing a battery cell 21 to be described later (see FIG. 5) and a battery management system 22 (see FIG. 5). The battery 20 may be, for example, a lithium ion battery or a nickel-hydrogen battery. The type of the battery 20 is not limited.

The electric motorcycle 1 includes a battery case 2 that stores the plurality of batteries 20. The battery case 2 has a box shape that is open upward, as shown in FIG. 2. A case cover 2a that closes the battery case 2 may be provided to the upper portion of the battery case 2. As shown in FIG. 1, the battery case 2 is disposed below the seat 6, for example. In such an example, when the seat 6 is removed and then the case cover 2a is opened, the battery 20 is able to be mounted on, and demounted from, the vehicle body. The position of the battery case 2 is not limited to the example shown in FIG. 1, and may be changed. As shown in FIG. 2, the battery case 2 in the electric motorcycle 1 has a structure capable of accommodating two batteries 20 therein. The number of batteries 20 in the battery case 2 may be greater than two.

As shown in FIG. 1, the electric motorcycle 1 includes an electric motor 31. The electric motor 31 is driven by electric power from the plurality of batteries 20 to supply a driving force to the rear wheel 7 that is a driving wheel. In an example, the plurality of batteries 20 mounted in the vehicle are simultaneously used to drive the electric motor 31. As another example, a battery 20 selected from among the plurality of batteries 20 mounted on the vehicle may be used to drive the electric motor 31 (see FIG. 15) while switching the batteries 20 to be used to drive the electric motor 31. The drive force transmission path from the electric motor 31 to the rear wheel 7 may include a deceleration mechanism 8 including a gear or a belt, and a drive force transmission member 11, such as a chain or a belt.

Figure 4:
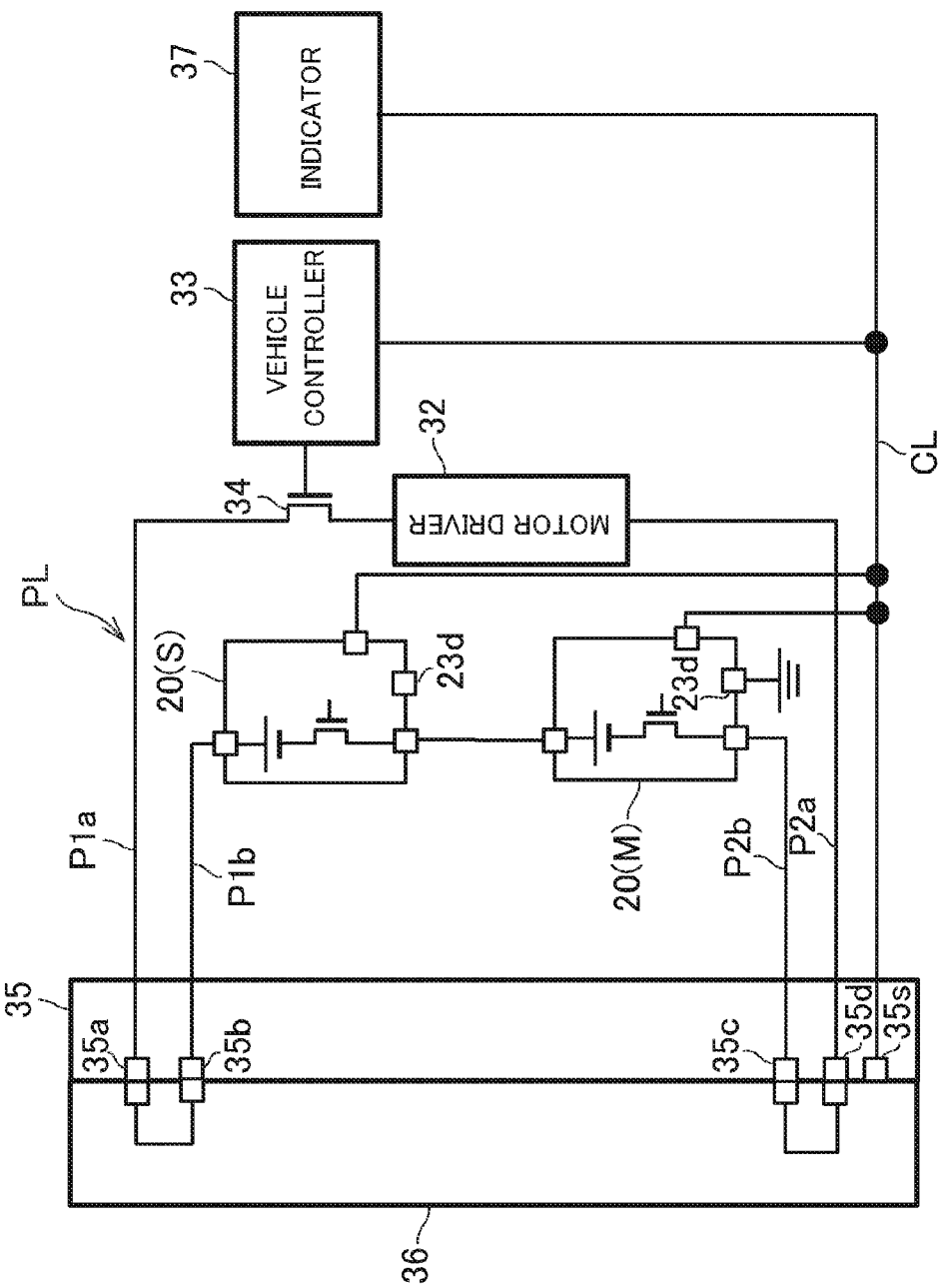
FIG. 4 is a block diagram showing components of a motorcycle.
Figure 5:
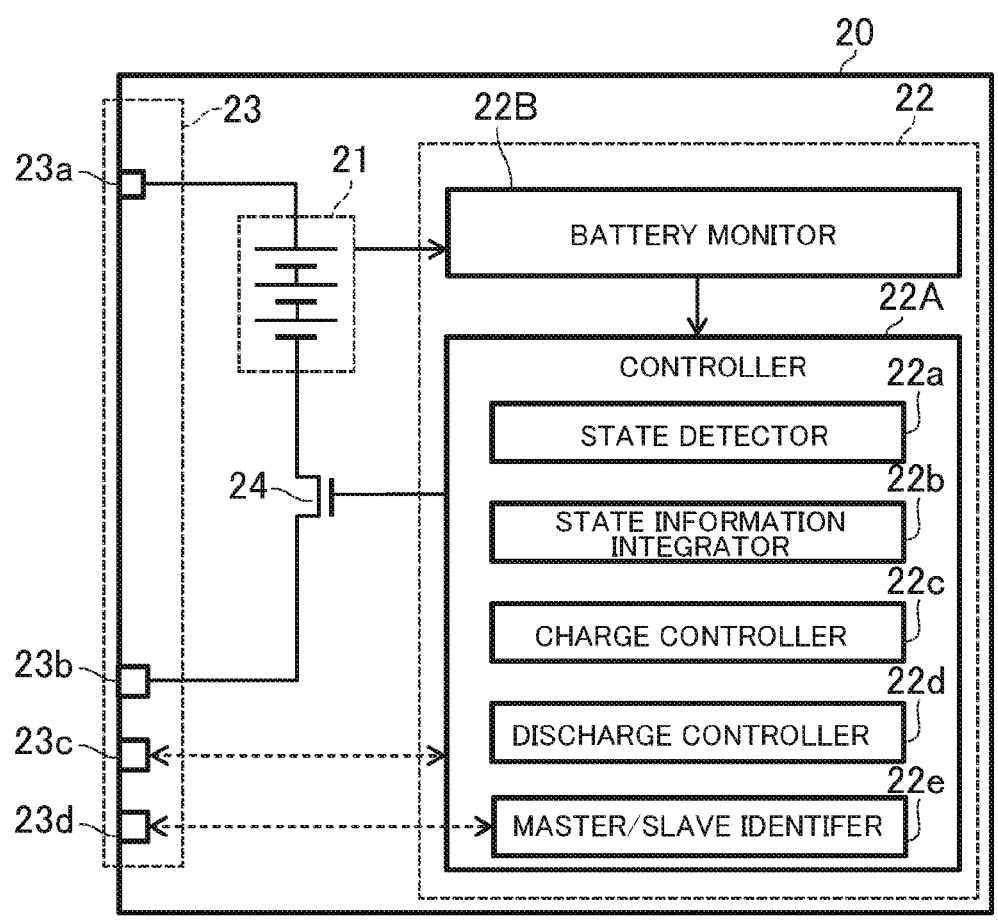
FIG. 5 is a block diagram showing components of a battery.
Figure 6:
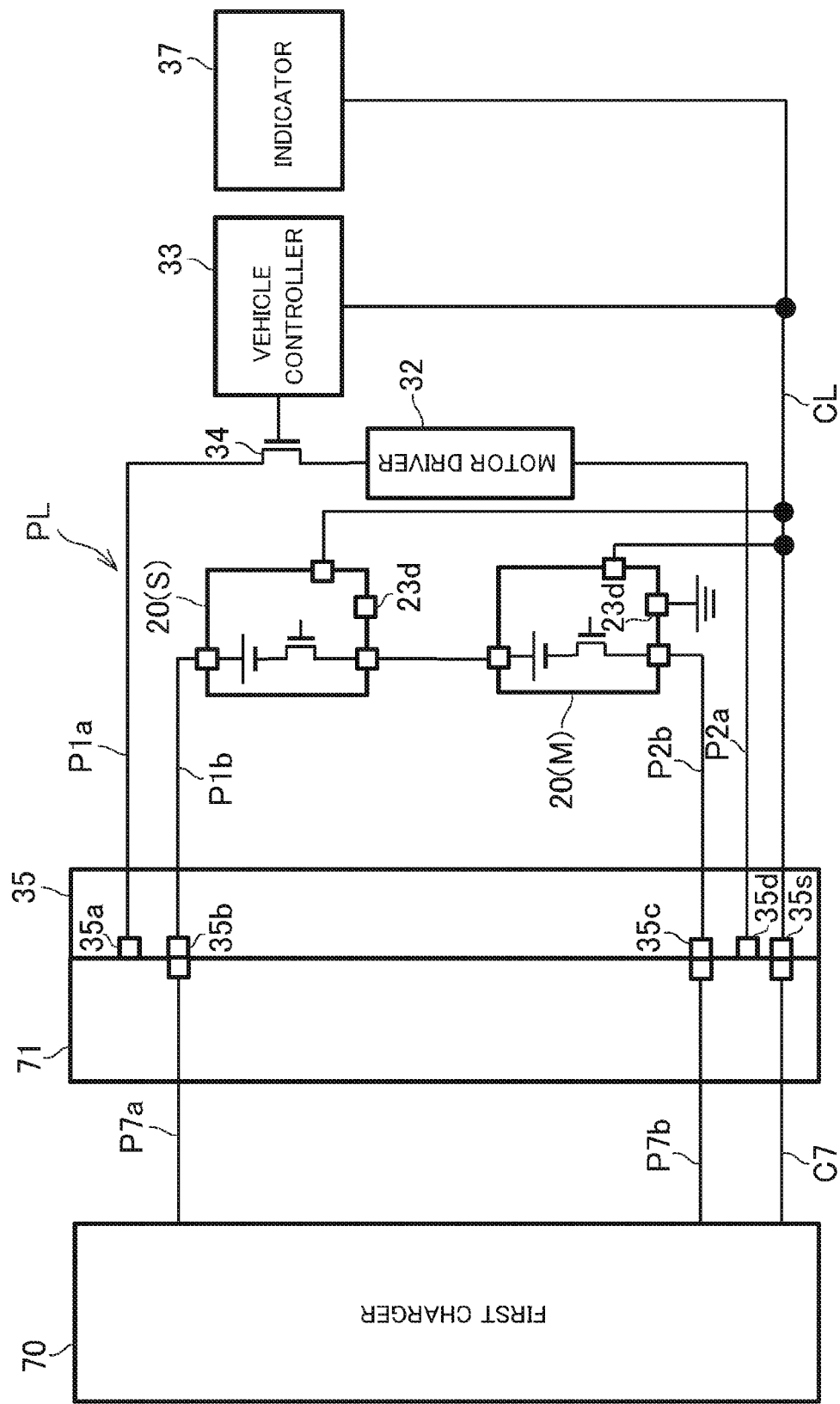
FIG. 6 is a block diagram showing a state in which a first charger that charges a plurality of batteries mounted on the vehicle body and the plurality of batteries are connected to each other.
Figure 7:
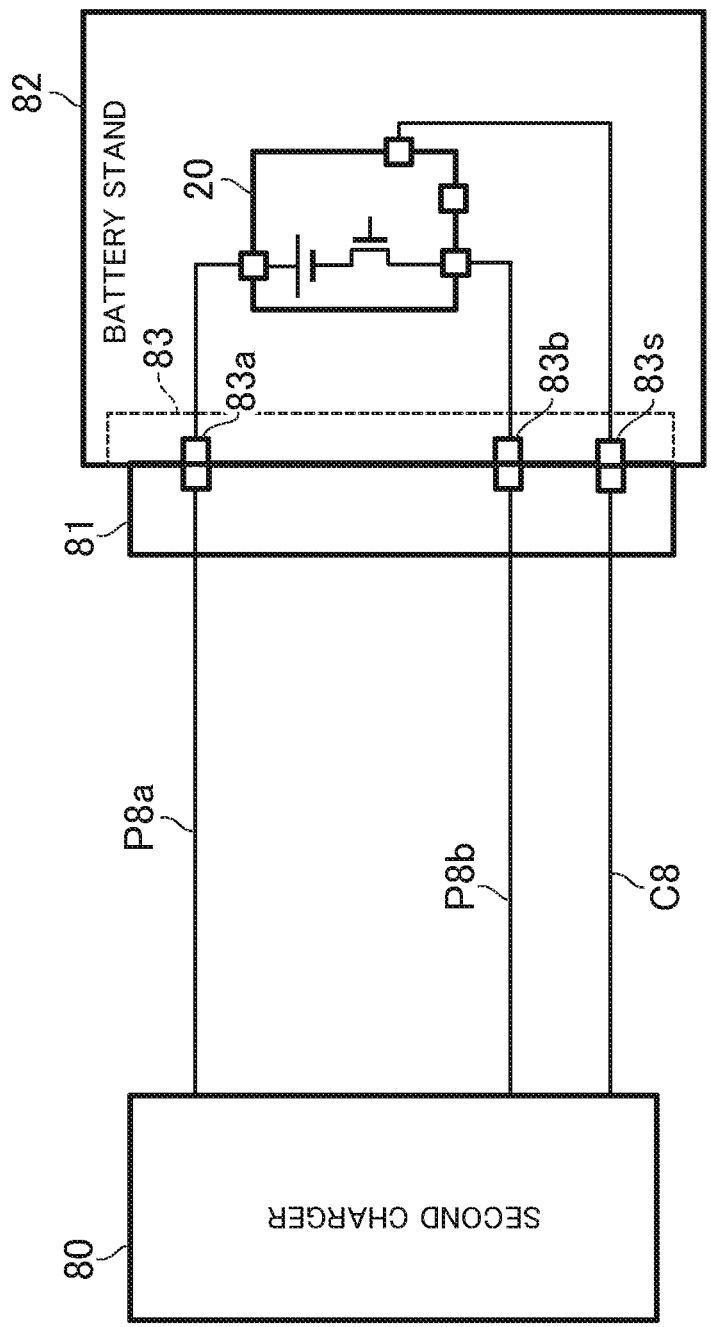
FIG. 7 is a block diagram showing a state in which a second charger that charges a battery demounted from the vehicle body and the battery are connected to each other.

FIG. 4 is a block diagram showing components of the electric motorcycle 1. FIG. 5 is a block diagram showing components of the battery 20. As is to be described later in detail, the battery 20 is able to be charged in a state of being mounted on the vehicle body and also in a state of being demounted from the vehicle body. FIG. 6 is a block diagram showing a state in which a first charger 70 that charges the plurality of batteries 20 mounted on the vehicle body and the plurality of batteries 20 are connected to each other. FIG. 7 is a block diagram showing a state in which a second charger 80 that charges the battery 20 demounted from the vehicle body and the battery 20 are connected to each other. In the example shown in FIG. 7, the second charger 80 is able to individually charge the battery 20. The first charger 70 preferably is a charger installed to a publicly available charging station, for example, and is capable of outputting a relatively high voltage. The second charger 80 preferably is a charger installed at a home, for example.

As is to be described later, when the plurality of batteries 20 are mounted on the vehicle body, one of the batteries works as a master battery that represents the plurality of batteries 20, while the remaining batteries 20 work as slave batteries. In FIGS. 4 and 6, a master battery is given reference numeral 20(M), while a slave battery is given reference numeral 20(S). In the description below, a reference numeral 20(M) is used in description of a master battery and a reference numeral 20(S) is used in description of a slave battery, while a reference numeral 20 is used in a description that does not discriminate between these batteries.

As shown in FIG. 4, the electric motorcycle 1 includes a motor driver 32 that receives power from the batteries 20 and supplies a driving power to the electric motor 31. The motor driver 32 includes an inverter that converts DC power received from the battery 20 into AC power and then supplies the converted power to the electric motor 31. The electric motorcycle 1 includes a vehicle controller 33. The vehicle controller 33 includes a memory and a CPU, and is configured or programmed to control the electric motor 31 via the motor driver 32. For example, the vehicle controller 33 detects an operation amount of the accelerator (that is, an operation amount of the accelerator grip 9a), and then calculates a target torque, based on the operation amount of the accelerator. The vehicle controller 33 generates an instruction value in accordance with the target torque, and the motor driver 32 supplies a current in accordance with the instruction value to the electric motor 31. A method for controlling the electric motor 31 by the vehicle controller 33 is not limited to the above described example.

As shown in FIG. 4, the electric motorcycle 1 may include an indicator 37. The indicator 37 is controlled by the vehicle controller 33. The vehicle controller 33 controls the indicator 37 based on information indicating the state of the battery 20 (for example, abnormality of the battery 20 and the remaining power of the battery 20) to inform the rider of the state of the battery 20. As is to be described later, the vehicle controller 33 receives information on the state of the battery 20 from the master battery 20(M). In detail, the vehicle controller 33 receives information on the state of the battery 20 from only the master battery 20(M).

As shown in FIG. 4, the electric motorcycle 1 includes a power line PL that supplies a current from the plurality of batteries 20 to the motor driver 32 (the power line PL in the example shown in FIG. 4 includes lines P1a, P1b, P2a, P2b). The power line PL includes a motor control switch 34 that disconnects power supply to the motor driver 32. The motor control switch 34 may include a power FET or a relay, for example. The vehicle controller 33 outputs a signal to control the on/off state of the motor control switch 34 to the motor control switch 34.

For example, the plurality of batteries 20 are serially connected to each other to supply power to the electric motor 31 (in other words, the motor driver 32). This ensures a high output of the electric motor 31. In FIG. 4, two batteries 20 are serially connected. Alternatively, two batteries 20 may be connected to each other in parallel to supply power to the motor driver 32. In the case where three or more batteries 20 are connected, all of these batteries 20 may be serially connected to each other. Batteries 20 connected in parallel and batteries 20 connected in series may coexist.

As shown in FIG. 5, each battery 20 includes a battery cell 21. Electrodes of the battery cell 21 are connected to respective charge/discharge terminals 23a, 23b of the battery 20. A battery control switch 24 is connected between the charge/discharge terminal 23b and the electrode of the battery cell 21, to disconnect these. The battery control switch 24 may include a power FET, a relay, or the like, for example.

Each battery 20 includes a battery management system 22 (the battery management system will be hereinafter referred to as a BMS). The BMS 22 includes a controller 22A and a battery monitor 22B. The battery monitor 22B is a sensor or a circuit element that monitors the state of the battery cell 21.

Specifically, the battery monitor 22B includes, for example, a temperature sensor that detects the temperature of the battery cell 21, a voltmeter that detects an output voltage of the battery cell 21, an ammeter that detects a current outputted from the battery cell 21 and a current supplied to the battery cell 21. A signal from the battery monitor 22B is inputted to the controller 22A.

The controller 22A includes a memory and a CPU. The controller 22A monitors the state of the battery 20, based on a signal of the battery monitor 22B. The controller 22A communicates with the vehicle controller 33 to notify the vehicle controller 33 of the state of the battery 20 (for example, the remaining battery power or abnormality) and to control the on/off state of the battery control switch 24 in response to a request from the vehicle controller 33. Further, the controller 22A communicates with the chargers 70, 80, and sends an instruction related to charge (for example, a charge preparation instruction, a current output start instruction, a charge stop instruction, or the like, refer to FIG. 9 and FIG. 10) to the chargers 70, 80. A processing executed by the controller 22A will be described later in detail.

The battery 20 includes a communication terminal 23c (see FIG. 5) for the controller 22A to communicate with the vehicle controller 33 and the chargers 70, 80. As shown in FIG. 4, when the battery 20 is mounted on the vehicle body, the communication terminal 23c is connected to the vehicle controller 33 via the communication line CL. Further, the communication terminal 23c is connected to the controller of the charger 70, 80 via the communication line CL when the battery 20 is being charged (see FIGS. 6 and 7). The controller 22A communicates with the vehicle controller 33 and the chargers 70, 80, based on a communication standard, such as CAN (Control Area Network), LIN (Local Interconnect Network), or the like.

As shown in FIG. 5, the battery 20 includes a connector 23 including the above described charge/discharge terminals 23a, 23b and the communication terminal 23c. The connector 23 is exposed outside the housing 20a of the battery 20 (see FIG. 3). When the battery 20 is mounted on the vehicle body, the connector 23 is connected to a receptacle provided to the battery case 2. As shown in FIG. 5, the connector 23 further includes a master/slave determination terminal 23d. When batteries 20 are mounted on the vehicle body, the controller 22A of a battery 20 determines whether the battery 20 is a master battery 20(M) or a slave battery 20(S), based on a signal inputted via the master/slave determination terminal 23d. Designation and function of the master battery 20(M) and the slave battery 20(S) will be described later.

The electric motorcycle 1 includes an inlet 35. As shown in FIG. 6, the inlet 35 is able to be connected to a charging plug 71 of the first charger 70 installed outside. The inlet 35 is provided to the vehicle body of the electric motorcycle 1 so as to be able to be exposed outside the vehicle body. For example, the inlet 35 may be located near the battery case 2. Alternatively, the inlet 35 may be provided below the seat 6. The position of the inlet 35 on the vehicle body is not limited to the above described positions.

When the charging plug 71 is connected to the inlet 35, the battery 20 (specifically, the charge/discharge terminals 23a, 23b) is connected to the first charger 70 via the inlet 35 and a cable (the power lines P7a, P7b) of the first charger 70. The power line PL of the electric motorcycle 1 includes power lines P1b, P2b to connect the charge/discharge terminals 23a, 23b of the battery 20 and the charging terminals 35b, 35c of the inlet 35. The power lines P1b, P2b supply power supplied from the first charger 70 to the plurality of batteries 20 mounted on the vehicle body. This enables simultaneous charging of the plurality of batteries 20. When the charging plug 71 is connected to the inlet 35, the communication terminal 23c of the battery 20 is connected to the first charger 70 via the inlet 35 and the cable (the communication line C7) of the first charger 70. This enables communication between the first charger 70 and the battery 20. A communication terminal 35s of the communication line CL provided to the vehicle body is provided to the inlet 35.

As shown in FIG. 4, when the charging plug 71 is not connected to the inlet 35, preferably, an inlet cover 36 is attached to the inlet 35. In the example of the electric motorcycle 1, terminals 35a, 35d of the respective power lines P1a, P2a connected to the motor driver 32 are provided to the inlet 35, and a line that connects the terminal 35b and the terminal 35a is provided to the inlet cover 36. Further, a line that connects the terminal 35c and the terminal 35d is provided to the inlet cover 36. When the inlet cover 36 is attached to the inlet 35, the lines provided to the inlet cover 36 and the power lines P1a, P2a together constitute a circuit that connects the plurality of batteries 20 and the motor driver 32. Providing the lines to the inlet cover 36 as described above makes unnecessary a switch (a power FET or a relay) to switch between a charging circuit and a discharging circuit. However, the inlet cover 36 may not necessarily include such a line. In this case, a switch that switches between a charging circuit and a discharging circuit may be provided to the vehicle body.

As described above, the plurality of batteries 20 are able to be individually demounted from the vehicle body. As shown in FIG. 7, the battery 20, demounted from the vehicle body, is able to be connected to the second charger 80. The battery 20 is supported by a battery stand 82, for example. The charge/discharge terminals 23a, 23b of the battery 20 are connected to the second charger 80 via a line provided to the battery stand 82 and a cable (power lines P8a, P8b) of the second charger 80. This enables power supply from the second charger 80 to the battery 20. Further, the communication terminal 23c of the battery 20 is connected to the second charger 80 via the line of the battery stand 82 and a cable (a communication line C8) of the second charger 80. This enables communication between the second charger 80 and the battery 20.

The battery stand 82 includes a receptacle that is able to be connected to the connector 23 of the battery 20. A charging plug 81 to be connected to a connector 83 of the battery stand 82 is provided to an end portion of the cable (power lines P8a, P8b, communication line C8) of the second charger 80. Charging terminals 83a, 83b and a communication terminal 83s are provided to the connector 83.

As described above, the electric motorcycle 1 includes a plurality of batteries 20 that are able to be individually demounted from the vehicle body. Each battery 20 includes the controller 22A configured or programmed to control charging. Thus, it is possible to charge each battery 20 demounted from the vehicle body. This facilitates the work of charging a battery, compared to a case in which a single large battery is mountable on and demountable from the vehicle body, for example. Further, as the electric motorcycle 1 includes the inlet 35, it is possible to charge the plurality of batteries 20 in the state of being mounted on the vehicle body.

Figure 8:
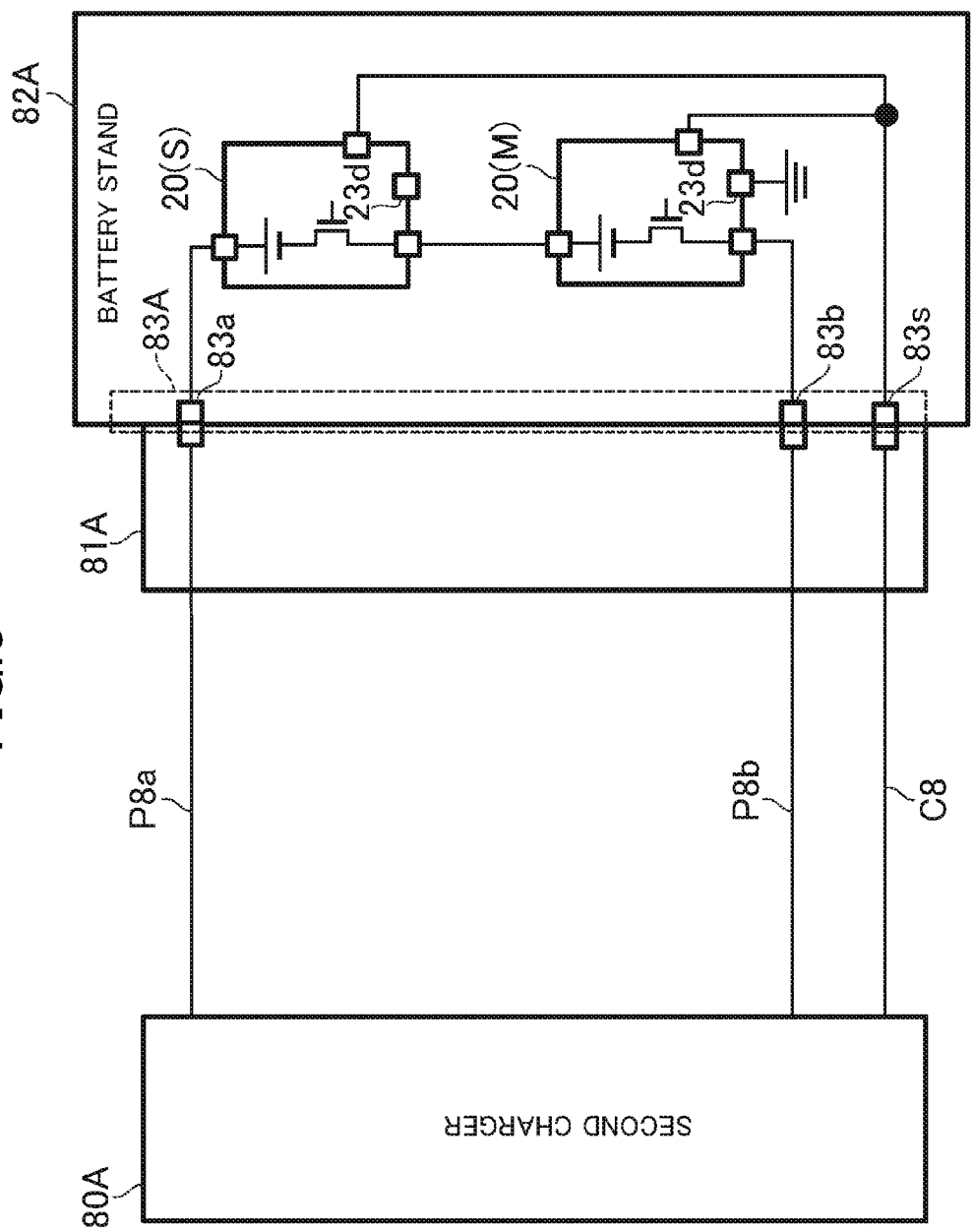
FIG. 8 shows a modified example of the second charger.

A plurality of batteries 20 may be connected to the second charger 80. FIG. 8 shows a modified example of the second charger 80. A plurality of batteries 20 are connected to a second charger 80A shown in this diagram. Specifically, a battery stand 82A that supports a plurality of batteries 20 is provided to the second charger 80A. The plurality of batteries 20 supported on the battery stand 82A are connected to the power lines P8a, P8b of the second charger 80A via a line provided to the battery stand 82A. This enables simultaneous charging of the plurality of batteries 20 by the second charger 81A. The plurality of batteries 20 may be serially connected on the battery stand 82A. The communication terminal 23c of each battery 20 is connected to the second charger 80A via a communication line provided to the battery stand 82A and the communication line C8 of the second charger 80A. The function and structure of the second charger 80A may be the same as those of the above described second charger 80. A charging plug 81A is provided to the second charger 80A, and the battery stand 82A includes a connector 83A. These may have the same structure as that of the above described charging plug 81 and connector 83.

When the plurality of batteries 20 are mounted on the vehicle body, one of the plurality of batteries 20 works as a master battery 20(M), while the other batteries 20 works as slave batteries 20(S) that communicate with the master battery 20(M). The master battery 20(M) communicates with the vehicle controller 33, the first charger 70, and the second charger 80A as a representative of the plurality of batteries 20. That is, the master battery 20(M) integrates information on the state of the master battery 20(M) and that on the slave battery 20(S) to send resulting integrated information to the vehicle controller 33. Further, when the plurality of batteries 20 are charged by the first charger 70, the master battery 20(M) communicates with the first charger 70, based on the information on the state of the master battery 20(M) and the information on the state of the slave battery 20(S), to execute a process for charging. In a similar way, when the plurality of batteries 20 are charged by the second charger 80A, the master battery 20(M) communicates with the second charger 80A, based on the information on the state of the master battery 20(M) and the information on the state of the slave battery 20(S), to execute a process for charging. Note here that the information on the state of the master battery 20(M) and the information on the state of the slave battery 20(S) include, for example, a remaining battery power, an abnormality, an output voltage of the battery cell 21, the temperature of the battery cell 21, or the like. The slave battery 20(S) sends state information on the slave battery 20(S) itself to the master battery 20(M), and controls the battery control switch 24, based on the information (request) sent from the master battery 20(M).

Each of the plurality of batteries 20 communicates with an external device (for example, a charger), and is able to be singly charged by a charger (for example, the second charger 80). However, when the plurality of batteries 20 are mounted on the vehicle body or when the plurality of batteries 20 are charged by the first charger 70 or the second charger 80A, the plurality of batteries 20 behave as if these were a single battery. With this function of the batteries 20, it is unnecessary for the vehicle controller 33 and the charger 70, 80A to execute special a process due to use of the plurality of batteries 20. For example, it is unnecessary for the vehicle controller 33 and the charger 70, 80A to identify, and communicate with, each battery 20 and monitor the states of each battery 20.

As shown in FIG. 5, the controller 22A of each battery 20 is configured or programmed to define a state detector 22a, a state information integrator 22b, a charge controller 22c, a discharge controller 22d, and a master/slave identifier 22e. Each of the plurality of batteries 20 has these functions. That is, the controllers 22A of batteries 20 have the same functions as each other. Accordingly, each of the battery 20 is capable of working as the master battery 20(M) and also working the slave battery 20(S).

The master/slave identifier 22e determines whether or not its own battery 20 (itself) is a master battery 20(M) or whether or not its own battery 20 (itself) is a slave battery 20(S). This process can be achieved according to a method described below, for example. The battery case 2 includes a plurality of battery mount positions in which the plurality of batteries 20 are placed. A terminal to be electrically connected to the master/slave determination terminal 23d is selectively provided to the plurality of battery mount positions (this terminal will be hereinafter referred to as a "role designation terminal"). The role designation terminal is configured to input a predetermined signal (for example, a ground signal) to the master/slave determination terminal 23d of the battery 20 (this signal will be hereinafter referred to as a "role designation signal"). The master/slave identifier 22e determines whether or not its own battery 20 is a master battery 20(M) or whether or not its own battery 20 is a slave battery 20(S), based on the role designation signal.

When the battery case 2 is able to store two batteries 20, the role designation terminal is provided to only one of two battery mount positions. When a role designation signal is detected, the master/slave identifier 22e determines that its own battery 20 is designated as a master battery 20(M). Alternatively, the master/slave identifier 22e may determine that its own battery 20 is designated as a slave battery 20(S) when a role designation signal is detected. When three or more batteries 20 are able to be stored in the battery case 2, a role designation terminal may be provided to one of the plurality of battery mount positions. In this case, the master/slave identifier 22e determines that its own battery 20 is designated as a master battery 20(M) when the role designation signal is detected.

The state detector 22a monitors the state of the battery 20, based on a signal of the battery monitor 22B. In an example, the state detector 22a detects the temperature of the battery cell 21. The state detector 22a may compare the temperature of the battery cell 21 and a threshold (the upper limit value and/or the lower limit) to determine whether or not the temperature of the battery cell 21 is abnormal. As another example, the state detector 22a detects an output current or a charging current of the battery cell 21 to calculate a remaining battery power, based on the current. As still another example, the state detector 22a detects the voltage of the battery cell 21. The state detector 22a may determine whether or not the voltage of the battery cell 21 has reached an abnormal value. As yet another example, the state detector 22a may determine, based on a signal of the battery monitor 22B, whether or not any abnormality is occurring to a sensor or a circuit element (ammeter, voltmeter) that constitutes the battery monitor 22B. Note here that the information detected or calculated by the state detector 22a and the result of determination by the state detector 22a correspond to "information on the state of a battery" described above. These information items will be hereinafter referred to as "individual state information". In the case where the battery 20 is a slave battery 20(S), the state detector 22a sends individual state information to the master battery 20(M).

When a battery 20 is designated as the mater battery 20(M), the state information integrator 22b of the battery 20 obtains (receives) individual state information of the other battery 20, that is, the slave battery 20(S). Then, the state information integrator 22b integrates the individual state information of the master battery 20(M) and the individual state information of the slave battery 20(S). "To integrate the individual state information of the master battery and the individual state information of the slave battery" means calculation or selection of one piece of battery state information, based on the individual state information of the master battery and the individual state information of the slave battery. Specifically, "to integrate the individual state information of the master battery and the individual state information of the slave battery" includes calculating a sum of the numeric values indicating the states of the respective batteries 20 or selecting one piece of information from some piece of information (including numeric values) indicating the states of a plurality of respective batteries, according to a predetermined rule. With the above, the vehicle controller 33, the first charger 70, and the second charger 80A execute a process to drive the electric motor 31, display control of the indicator 37, and process for charging, while regarding the plurality of batteries 20 as a single battery. In the following, information obtained through integration will be referred to as "integrated state information".

In an example, the state information integrator 22b selects, as the integrated state information, a higher one of the temperature of the master battery 20(M) and the temperature of the slave battery 20(S). The state information integrator 22b may select, as the integrated state information, a lower one of the temperature of the master battery and that of the slave battery, and compare the lower temperature with a predetermined lower limit. That is, the lower temperature may be regarded as the temperature of the whole of the plurality of batteries 20, and then compared with the lower limit.

When the plurality of batteries 20 are serially connected, the state information integrator 22b may define a lower one of the remaining battery power of the master battery 20(M) and the remaining battery power of the slave battery 20(S) as the integrated state information. That is, a lower remaining battery power may be defined as the remaining battery power of the whole of the plurality of batteries 20. Meanwhile, when the plurality of batteries 20 are connected in parallel, the remaining battery power of the master battery 20(M) is generally equal to that of the slave battery 20(S). Therefore, in this case, the state information integrator 22b may define either of the remaining battery power of the master battery 20(M) and that of the slave battery 20(S) as the integrated state information.

When the plurality of batteries 20 are serially connected, the state information integrator 22b may define the sum of the voltage of the master battery and that of the slave battery to consider as the integrated state information. Meanwhile, when the plurality of batteries 20 are connected in parallel, the state information integrator 22b may define the voltage of the master battery 20(M) as the integrated state information.

In another example, when an abnormality occurs to either of the master battery 20(M) and the slave battery 20(S), the state information integrator 22b may define information indicating an abnormality occurrence as the integrated state information. For example, when the temperature sensor of the master battery 20(M) is normal and that of the slave battery 20(S) is abnormal, information indicating an abnormality of the temperature sensor may be defined as the integrated state information. In this case, it is determined that an abnormality is occurring to the plurality of batteries 20.

When the battery 20 is designated as the master battery 20(M), the state information integrator 22b sends the integrated state information to the vehicle controller 33. Further, the state information integrator 22b may send the integrated state information to the first charger 70 or the second charger 80A. Meanwhile, when the battery 20 is a slave battery, the state information integrator 22b may not work.

When the battery 20 is designated as the master battery 20(M), the charge controller 22c communicates with the first charger 70, based on the state of the master battery 20(M) and that of the slave battery 20(S), and executes a process for charging. The charge controller 22c executes the process for charging while communicating with the first charger 70, based on the integrated state information obtained by the state information integrator 22b, for example. Specifically, the charge controller 22c sends an instruction related to charge to the first charger 70, based on the integrated state information (a "instruction related to charge" will be hereinafter related as a charge instruction). The charge controller 22c of the master battery 20(M) relays between the first charger 70 and the slave battery 20(S). As is to be described later, the charge controller 22c of the master battery 20(M) may execute the process for charging while communicating with the first charger 70, based on the individual state information of the master battery 20(M) and the individual state information of the slave battery 20(S) instead of or together with the integrated state information.

Figure 9:
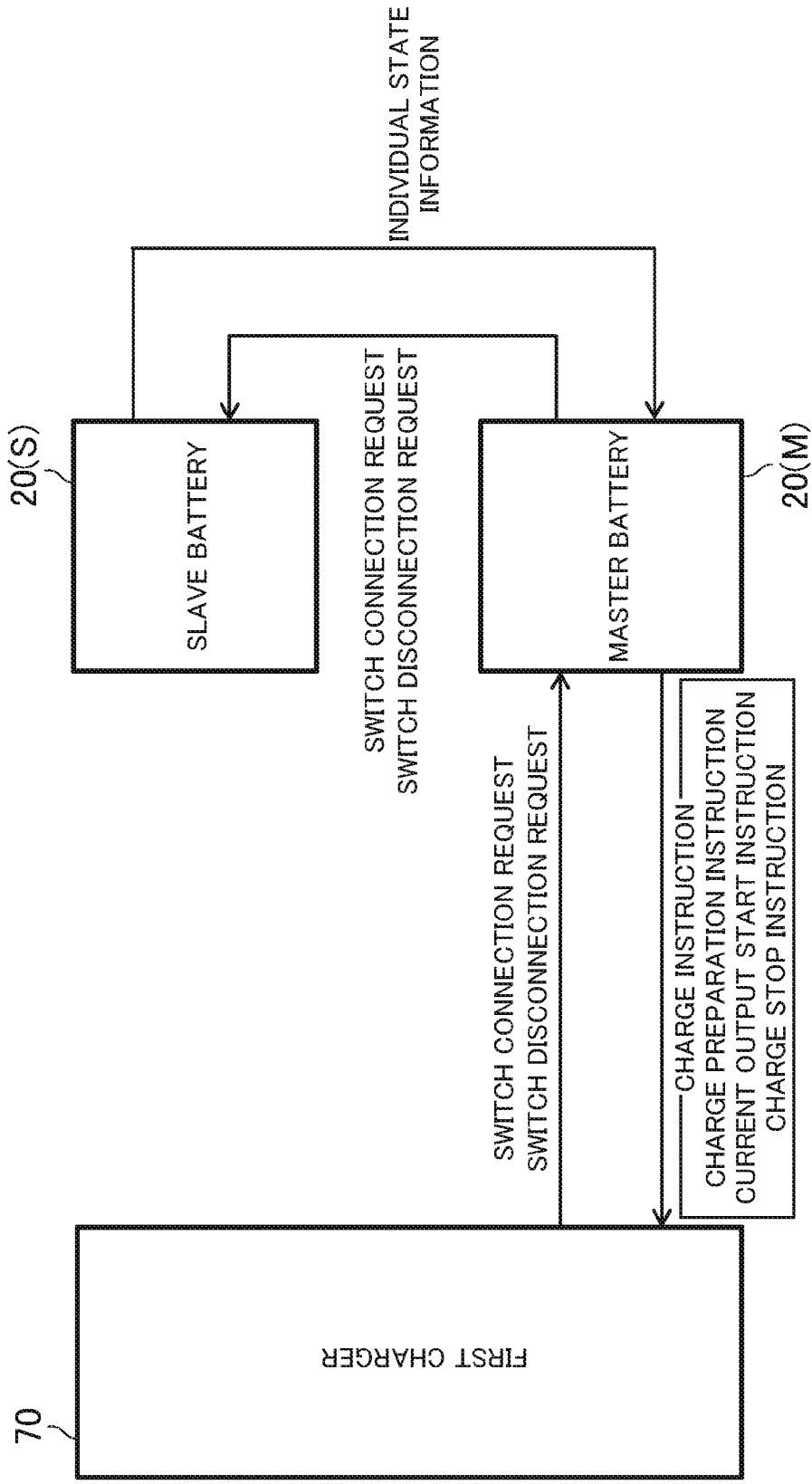
FIG. 9 explains information exchanged between a battery and the first charger when the battery is being charged by the first charger.

FIG. 9 explains information exchanged between the battery 20 and the first charger 70 when charging by the first charger 70 is executed.

When the plurality of batteries 20 are serially connected as shown in FIG. 6, a process described below is executed as an example using the integrated state information. That is, when connection between the batteries 20 and the first charger 70 is detected (when connection of the charging plug 71 to the inlet 35 is detected), the charge controller 22c determines whether or not it is appropriate to start charging, based on the integrated state information. That is, the charge controller 22c determines whether or not the integrated state information satisfies a predetermined charge start condition. With the above, it is possible to prevent charging from starting when any one of the plurality of batteries 20 is in a state in which charging should be refrained.

For example, the charge controller 22c determines whether or not the temperature of the battery cell 21 obtained as integrated state information satisfies a predetermined temperature condition. Further, the charge controller 22c determines whether or not any abnormality information obtained as integrated state information is not appropriate to start charging (for example, abnormality of a sensor or a circuit element). When the temperature of the battery cell 21 and the abnormality information satisfies a predetermined condition (specifically, the temperature is normal and no abnormality occurs to any sensor), the charge controller 22c sends a charge preparation instruction that is one of a charge instruction to the first charger 70. In the above, the charge controller 22c may determine whether or not the remaining battery power obtained as integrated state information satisfies a predetermined condition, for example, whether or not the remaining battery power is lower than a predetermined threshold. The charge controller 22c may calculate a current value which the first charger 70 should output, based on the integrated state information, and may notify the first charger 70 of the current value as a charge instruction. For example, the charge controller 22c may calculate the current value, based on the temperature of the battery cell 21.

Having received the charge preparation instruction from the master battery 20(M), the first charger 70 makes a preparation for charging. For example, the first charger 70 turns on the relay provided to the first charger 70. Thereafter, the first charger 70 starts sending a switch connection request to the master battery 20(M). When the remaining battery power satisfies the above described condition (that is, when the remaining battery power is lower than the threshold), the master battery 20(M) having received the switch connection request connects the battery control switch 24 (turning on the battery control switch 24). Further, the master battery 20(M) transfers the switch connection request to the slave battery 20(S). And then, the slave battery 20(S) connects the battery control switch 24 in accordance with the switch connection request. Thereafter, when the charge controller 22c of the master battery 20(M) sends a current output start instruction to the first charger 70, the first charger 70 starts to output a current. With the above, charging by the first charger 70 starts. Note that before starting current output, the first charger 70 may determine, based on the inter-terminal voltage, whether or not the battery control switch 24 of the battery 20 is in an ON state. And then, the first charger 70 may start current output when the battery control switch 24 of the battery 20 is in the ON state.

In charging, the charge controller 22c determines to stop or end charging, based on the integrated state information. That is, the charge controller 22c determines whether or not the integrated state information satisfies a predetermined charge stop/end condition. For example, the charge controller 22c determines whether or not the temperature of the battery cell 21 obtained as integrated state information satisfies a predetermined charge stop temperature condition. Further, the charge controller 22c determines whether or not the remaining battery power obtained as integrated state information has reached a predetermined charge end condition. When the integrated state information satisfies the predetermined charge stop/end condition, the charge controller 22c sends a charge stop instruction as one of the above described charge instructions to the first charger 70.

In charging, the states of both of the master battery 20(M) and the slave battery 20(S) are monitored. In charging, the slave battery 20(S) sends individual state information obtained by the state detector 22a to the master battery 20(M). Then, the master battery 20(M) calculates integrated state information, based on the individual state information of the master battery 20(M) and the individual state information of the slave battery 20(S). Alternatively, in charging, the charge controller 22c may determine to stop or end charging, based on the individual state information of the master battery 20(M) and the individual state information of the slave battery 20(S), instead of the integrated state information.

After receiving the charge stop instruction from the master battery 20(M), the first charger 70 stops current output, and sends a switch disconnect request. Having received the switch disconnect request, the charge controller 22c disconnects the battery control switch 24 (turning off the battery control switch 24). Further, the charge controller 22c of the master battery 20(M) transfers the switch disconnect request to the slave battery 20(S). Then, the slave battery 20(S) disconnects the battery control switch 24 in accordance with the switch disconnect request.

According to the charge controller 22c of the master battery, both of the master battery 20(M) and the slave battery 20(S) can be charged without the first charger 70 directly communicating with the slave battery 20(S). Note that process by the charge controller 22c is not limited to that described above. For example, the charge controller 22c may send a portion or an entirety of the integrated state information to the first charger 70. In this case, the first charger 70 may determine whether or not it is appropriate to start, continue, or end charging, based on the integrated state information.

Figure 11A:
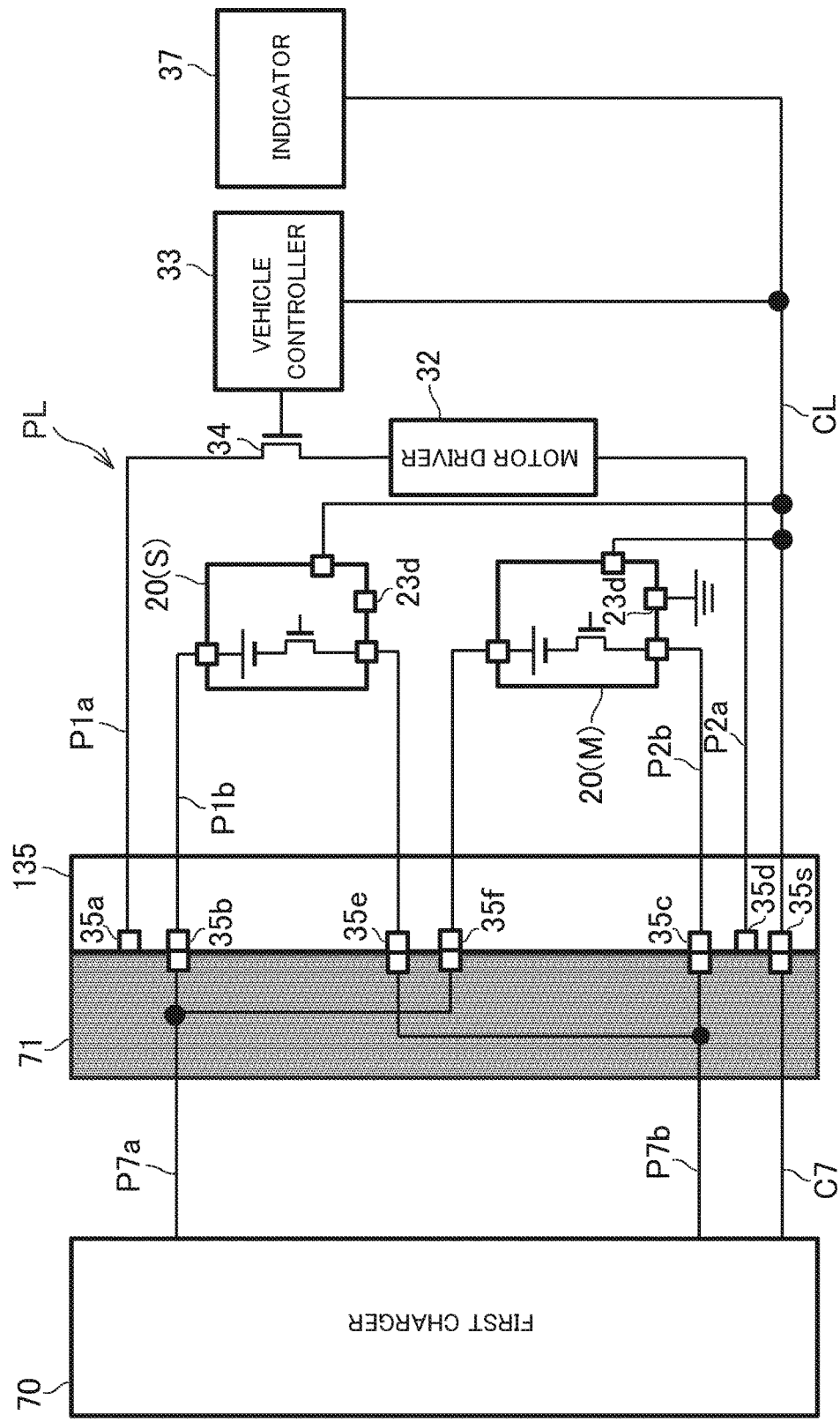
FIG. 11A is a block diagram showing a modified example of a connection between the first charger and a plurality of batteries.

The master battery 20(M) (the charge controller 22c) may communicate with the first charger 70, based on the individual state information of the plurality of batteries 20 together with or instead of the integrated state information, and execute the process for charging. For example, when the plurality of batteries 20 are connected in parallel as shown in FIG. 11A, the master battery 20(M) may determine whether or not it is appropriate to charge the respective batteries 20, based on the individual state information of the plurality of batteries 20. Specifically, the master battery 20(M) may determine whether or not it is appropriate to charge each battery 20, based on the remaining battery power of each battery 20.

When the plurality of batteries 20 are connected in parallel, a process described below is executed as an example using the individual state information. In this case as well, the charge controller 22c determines whether or not the temperature of the battery cell 21 satisfies a predetermined condition and whether or not there is any abnormality information not appropriate to start charging. This determination may be made based on the integrated state information or the individual state information. When no abnormality is occurring to any battery 20, the charge controller 22c sends the charge preparation instruction to the first charger 70.

The charge controller 22c selects a battery that needs to or can be charged from among the plurality of batteries 20, based on the remaining battery powers of the respective batteries 20. For example, in the case where the remaining battery power of the master battery 20(M) is sufficient and that of the slave battery 20(S) is low, the charge controller 22c selects the slave battery 20(S). Having selected any battery 20, the charge controller 22c executes a process to connect the battery control switch 24 of only the selected battery 20. Specifically, when the slave battery 20(S) is selected, the charge controller 22c sends a switch connection request to the slave battery 20(S), which then connects the battery control switch 24 of the slave battery 20(S), based on the switch connection request received. With the above, charging by the first charger 70 starts with respect to the slave battery 20(S). Meanwhile, when the master battery 20(M) is selected, the charge controller 22c connects the battery control switch 24 of its own battery 20.

Thereafter, when the charge controller 22c sends an output start instruction to the first charger 70, the first charger 70 starts current output. Note that before starting current output, the first charger 70 may determine, based on an inter-terminal voltage, whether or not the battery control switch 24 of any battery 20 is in the ON state, and may start current output when the battery control switch 24 of the battery 20 is in the ON state. In charging, the slave battery 20(S) sends individual state information to the master battery 20(M). The charge controller 22c of the master battery 20(M) determines to stop or end charging, based on the individual state information of the battery 20 being charged. That is, the charge controller 22c determines whether or not the individual state information of the battery 20 being charged satisfies a predetermined charge stop/end condition. When the individual state information satisfies the predetermined charge stop/end condition, the charge controller 22c sends a charge stop instruction to the first charger 70.

Figure 10:
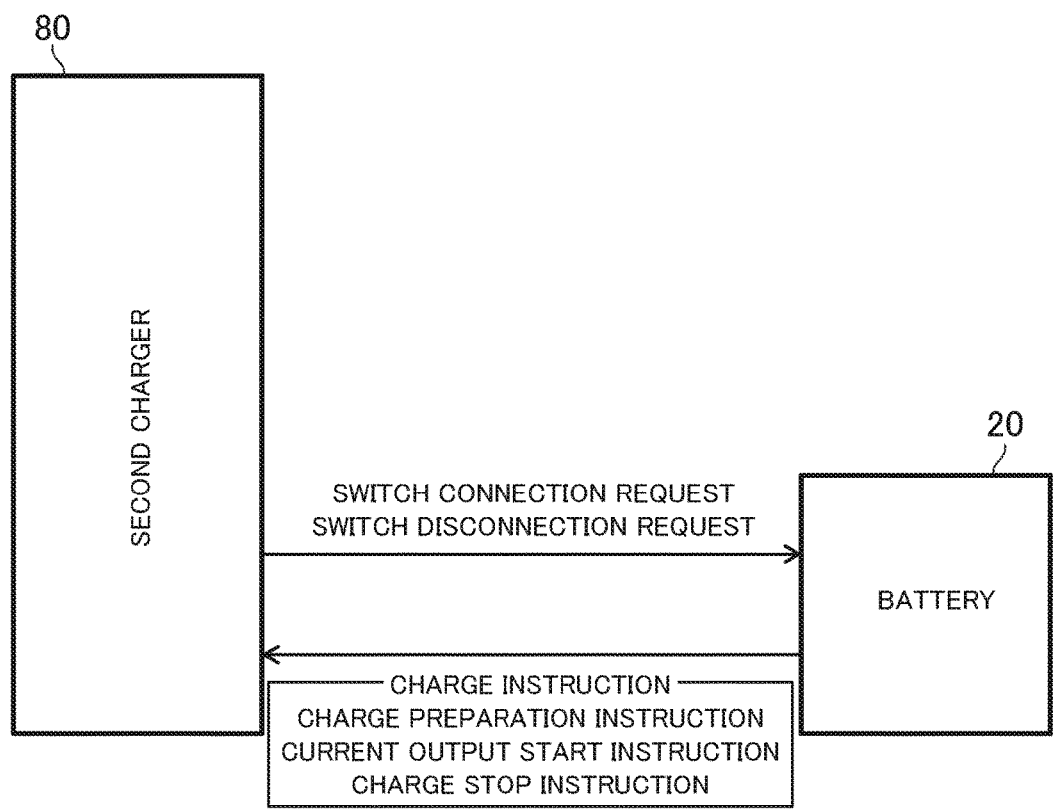
FIG. 10 explains information exchanged between a battery and the second charger shown in FIG. 7 when the battery is being charged by the second charger.

As described above, the second charger 80 shown in FIG. 7 is configured to execute individual charging of the battery 20. In charging by the second charger 80, the state information integrator 22b does not work. The battery 20 executes a process for charging by the second charger 80, based on the state information (individual state information) of its own. Specifically, the battery 20 sends an instruction for charging (that is, the above descried "charge instruction") to the second charger 80, based on the individual state information. FIG. 10 explains information exchanged between the battery 20 and the second charger 80 in charging by the second charger 80.

When connection between the battery 20 and the second charger 80 is detected (when connection of the charging plug 81 to the connector 83 of the battery stand 82 is detected), the charge controller 22c determines whether or not it is appropriate to start charging, based on the individual state information obtained by the state detector 22a. That is, the charge controller 22c determines whether or not the individual state information satisfies a predetermined charge start condition. For example, the charge controller 22c determines whether or not the temperature of the battery cell 21 obtained as the individual state information satisfies a predetermined charge start temperature condition. Further, the charge controller 22c may determine whether or not any abnormality information (for example, abnormality in a sensor or a circuit element) obtained as the individual state information, are not appropriate for charging. When the individual state information satisfies the predetermined condition (specifically, when the temperature is normal and abnormality is not occurring to a sensor or the like), the charge controller 22c sends a charge preparation instruction as a charge instruction to the second charger 80. Further, the charge controller 22c may determine whether or not the remaining battery power obtained as the individual state information satisfies a predetermined condition, for example, whether or not the remaining battery power is lower than a threshold.

The charge controller 22c may calculate a current value which the second charger 80 should output, based on the individual state information, and send the current value as a charge instruction to the second charger 80. For example, the charge controller 22c may calculate a current value, based on the temperature of the battery cell 21 obtained as the individual state information.

Having received the charge preparation instruction from the battery 20, the second charger 80 prepares for charging by turning on the relay of the second charger 80, for example. Thereafter, the second charger 80 starts sending a switch connection request to the battery 20. When the remaining battery power satisfies the above described condition (when being lower than a threshold), the battery 20 (the charge controller 22c) having received the switch connection request connects the battery control switch 24 (turning on the battery control switch 24). The charge controller 22c sends a current output start instruction to the second charger 80, which then outputs a current. With the above, charging by the second charger 80 starts. Note that before starting current output, the second charger 80 may determine, based on the inter-battery voltage, whether or not the battery control switch 24 of the battery 20 is in the ON state, and may start current output when the battery control switch 24 of the battery 20 is the ON state.

In charging, the charge controller 22c determines whether or not it is appropriate to stop or end charging, based on the individual state information. That is, the charge controller 22c determines whether or not the individual state information satisfies a predetermined charge stop/end condition. For example, the charge controller 22c determines whether or not the temperature of the battery cell 21 obtained as the individual state information satisfies a predetermined charge stop temperature condition. Further, the charge controller 22c determines whether or not the remaining battery power obtained as the individual state information has reached a predetermined charge end condition. When the individual state information satisfies the predetermined charge stop/end condition, the charge controller 22c sends a charge stop instruction to the second charger 80.

Having received the charge stop instruction from the battery 20, the second charger 80 stops current output, and sends the switch disconnect request. Having received the switch disconnect request, the charge controller 22c disconnects the battery control switch 24.

As described above, when the battery 20 is connected to the second charger 80, the charge controller 22c executes a process for charging while communicating with the second charger 80, based on the individual state information. Therefore, it is possible to individually charge a plurality of batteries 20 when the second charger 80 is used. Note that the process performed by the charge controller 22c is not limited to the above described. That is, the charge controller 22c may send a portion or an entirety of the individual state information to the second charger 80. In this case, the second charger 80 may determine whether or not it is appropriate to start, continue, or end charging, based on the individual state information.

As described above, the second charger 80A shown in FIG. 8 can be simultaneously connected to a plurality of batteries 20, similar to the first charger 70. In this case, the above described role designation terminal is provided to the second charger 80A as well. As a result, when the battery 20 is connected to the second charger 80A, the master/slave identifier 22e determines, based on the role designation signal, whether or not its own battery 20 is a master battery 20(M) or a slave battery 20(S). In charging by the second charger 80A as well, the charge controller 22c may execute processing similar to that which is executed when the battery 20 is connected to the first charger 70.

Note that it is preferable that the battery 20 determines the type of the charger to which the battery 20 is connected, without a special process executed in the second charger 80. In an example, the battery 20 executes processing to search for other batteries 20 when connection to any charger is detected. Specifically, when connection to any charger is detected, the battery 20 sends to other batteries 20 a signal to request to send a response. Then, when no response returned over a predetermined period of time, it is determined that the battery 20 alone is connected to the second charger 80.

For example, in a case where the role designation signal is a signal that designates a master battery 20(M), the following process is executed. When a battery 20 detects a connection to any charger, but does not receive role designation signal via the master/slave determination terminal 23d, the battery 20 sends to a master battery 20(M) a signal to request a response. When no response returned over a predetermined period of time, it is determined that the battery 20 alone is connected to the second charger 80. Meanwhile, when a battery 20 receives a role designation signal via the master/slave determination terminal 23d and receive a response request from other batteries 20, the battery 20 works as the master battery 20(M) and returns a predetermined signal. Determination of the type of a charger to which the battery 20 is connected is not limited to the above described, and may be desirably modified.

When a battery 20 is designated as the master battery 20(M), the discharge controller 22d of the battery 20 controls the battery control switch 24 of the battery 20 according to an instruction related to discharge received from the vehicle controller 33 (the instruction related to discharge will be hereinafter referred to as a "discharge instruction"). Further, the discharge controller 22d transfers the discharge instruction received from the vehicle controller 33 to other batteries 20 (that is, the slave battery 20(S)).

For example, when the discharge controller 22d receives a discharge start instruction from the vehicle controller 33, the discharge controller 22d connects the battery control switch 24 of the battery 20 (turning on the battery control switch 24). At the same time, the discharge controller 22d transfers the discharge start instruction to the slave battery 20(S). With the above, the battery control switch 24 is connected in the slave battery 20(S) as well. As a result, it is possible to supply power to the motor driver 32 from the plurality of batteries 20. Meanwhile, when a discharge stop instruction is received from the vehicle controller 33, the discharge controller 22d disconnects the battery control switch 24 of the battery 20 (turning off the battery control switch 24), and moreover transfers the discharge stop instruction to the slave battery 20(S). With the above, the battery control switch 24 is disconnected also in the slave battery 20(S). As a result, power supply to the motor driver 32 from the plurality of batteries 20 is stopped.

The state information integrator 22b sends the integrated state information to the vehicle controller 33. The vehicle controller 33 controls the vehicle, based on the integrated state information, while the vehicle is running. For example, the vehicle controller 33 determines to start or stop driving the electric motor 31, based on the remaining battery power, the temperature of the battery cell 21, the output voltage of the battery 20, and information indicating abnormality. The remaining battery power, the temperature of the battery cell 21, the output voltage of the battery 20, and the information indicating abnormality are sent to the vehicle controller 33 from the master battery 20(M) as the integrated state information. Based on the information, the vehicle controller 33 determines whether or not the states of the plurality of batteries 20 satisfy a predetermined condition for starting the electric motor 31 and whether or not the states of the plurality of batteries 20 satisfy a predetermined condition for stopping the electric motor 31.

Further, the vehicle controller 33 controls the indicator 37, based on the integrated state information. For example, in the case where the indicator 37 is able to display the remaining battery power or the temperature of the battery cell 21, the vehicle controller 33 displays the remaining battery power, or the integrated state information, on the indicator 37.

When a plurality of batteries 20 are mounted on the vehicle body, it is required that the vehicle controller 33 does not use the individual state information sent from the slave battery 20(S). Similarly, it is required that the charger 70, 80A does not use the individual state information sent from the slave battery 20(S). As processing for this purpose, a dedicated protocol may be applied to communication between the master battery 20(M) and the slave battery 20(S). For example, the master battery 20(M) and the slave battery 20(S) may add a predetermined dedicated reference mark to information (for example, the individual state information, the switch connection request, or the switch disconnect request) exchanged between the master battery 20(M) and the slave battery 20(S). Preferably, the vehicle controller 33 and the chargers 70, 80A do not receive information with the reference mark added thereto. That is, when the dedicated protocol is applied to communication between the master battery 20(M) and the slave battery 20(S), erroneous receiving of the individual state information by the vehicle controller 33 and the chargers 70, 80A is prevented.

The present invention is not limited to the above described preferred embodiments and various modifications are possible. In the following, modified examples will be described. A member same as that which has been described above is given the same reference numeral, and not described again.

As described above, in charging by the first charger 70 and/or the second charger 80A, a plurality of batteries 20 may be connected in parallel. Parallel connection enables selective charging of the plurality of batteries 20. As a result, in the case where the remaining battery powers of the plurality of batteries 20 are different from one another, for example, it is possible to first charge the battery 20 with a low remaining power, and then to start charging the other batteries 20 once the difference in the remaining battery power is reduced or solved.

Figure 11B:
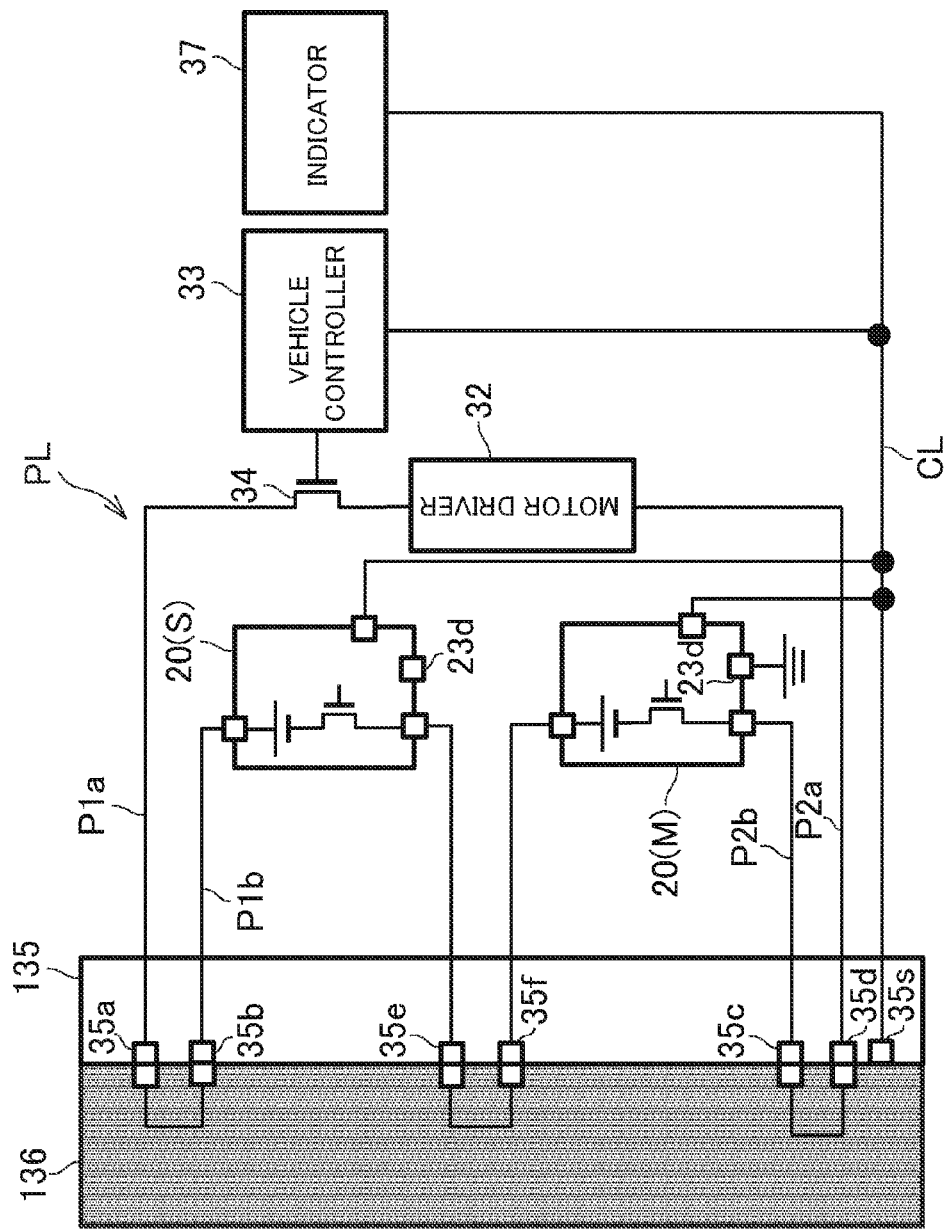
FIG. 11B is a block diagram showing a connection between a plurality of batteries when the vehicle shown in FIG. 11A is running.

FIGS. 11A and 11B are block diagrams explaining a modified example of the electric motorcycle 1. In these diagrams, the electric motorcycle 1 has a structure that enables parallel connection of a plurality of batteries 20 when being charged. FIG. 11A shows a modified example of the connection between the first charger 70 and the plurality of batteries 20, and FIG. 11B shows the connection of the plurality of batteries 20 when the vehicle is running.

In FIG. 11A, the plurality of batteries 20 (more specifically, two batteries 20) are connected in parallel when being charged by the first charger 70. That is, the positive electrode of each battery 20 is connected to the power line P7a of the first charger 70, and the negative electrode of each battery 20 is connected to the power line P7b of the first charger 70. In the example shown in FIG. 11A, the electric motorcycle 1 includes an inlet 135. The inlet 135 is different from the above described inlet 35 in that the inlet 135 includes a plurality of charging terminals 35b, 35f connected to the respective positive electrodes of the plurality of batteries 20 and a plurality of charging terminals 35e, 35c connected to the respective negative electrodes of the plurality of batteries 20. A charging plug 71 of the first charger 70 includes a plurality of terminals for connection to the respective charging terminals 35b, 35e, 35f, 35c. The charging terminals 35b, 35f are both connected to the power line P7a, while the charging terminals 35e, 35c are both connected to the power line P7b.

In the example shown in FIG. 11A as well, one of the plurality of batteries 20 works as the master battery 20(M) and the remaining batteries 20 work as the slave batteries 20(S). When the plurality of batteries 20 are connected in parallel, the controller 22A of the master battery 20(M) and the controller 22A of the slave battery 20(S) execute the above described processing based on the individual state information when charging by the first charger 70 is executed.

That is, the master battery 20(M) determines whether or not to execute selective charging, based on the individual state information of the master battery 20(M) and the individual state information of the slave battery 20(S). "Selective charging" means that any of a plurality of batteries 20 is selected and only the battery 20 selected is charged. Determination as to whether or not to execute the selective charging is made when the master battery 20(M) detects connection of the first charger 70, for example.

The master battery 20(M) determines whether or not to execute the selective charging, based on the difference in the remaining battery power between the master battery 20(M) and the slave battery 20(S). For example, when the difference in the remaining battery power is larger than a predetermined threshold, the master battery 20(M) determines to execute the selective charging, and starts charging the battery 20 with a low remaining battery power. Specifically, the master battery 20(M) connects the battery control switch 24 of the battery 20 selected as a target of the selective charging. That is, when the master battery 20(M) is the target of the selective charging, the battery control switch 24 of the master battery 20(M) is connected. Meanwhile, when the slave battery 20(S) is the target of the selective charging, the switch connection request is sent to the slave battery 20(S). Further, the master battery 20(M) sends the current output start instruction to the first charger 70.

After start of the selective charging, the master battery 20(M) may determine whether or not to end the selective charging, based on the individual state information of the battery 20 that is the target of the selective charging. In the above example, when the difference in the remaining battery power between the battery 20 that is the target of the selective charging and other batteries 20 becomes smaller than a predetermined threshold, the master battery 20(M) may determine to end the selective charging. In the above, the master battery 20(M) may start charging other batteries 20 subsequent to the selective charging.

The master battery 20(M) may use information indicating abnormality as the individual state information. That is, the master battery 20(M) may determine whether or not to execute charging, based on information indicating abnormality in the master battery 20(M) and information indicating abnormality in the slave battery 20(S). This determination is made before the determination as to whether or not to execute the selective charging is made on the basis of the remaining battery power. In an example, in a case where abnormality is occurring to any battery 20, the master battery 20(M) refrains charging relative to all of the batteries 20. In another example, in a case where there are a battery 20 with abnormality and a battery 20 without abnormality, the master battery 20(M) may determine to charge only the battery 20 without abnormality.

A plurality of batteries 20 may be connected in parallel when being charged, as shown in FIG. 11, and connected in series when the vehicle is running, that is, when the plurality of batteries 20 are supplying power to the motor driver 32. In the example shown in FIG. 11B, an inlet cover 136 is attached to the inlet 135. The inlet cover 136 includes a line that serially connects the plurality of batteries 20. Specifically, in addition to the above described terminals and lines on the inlet cover 36, terminals and a line that connects the terminal 35*e* and a terminal 35*f* of the inlet 135 are provided to the inlet cover 136. Use of the inlet cover 136 enables parallel connection of the plurality of batteries 20 when being charged, and serial connection of the same when the vehicle is running, without using a switch (a power FET or a relay). Note that a switch (power FET or a relay) may be used in switching between parallel connection and serial connection.

Note that although a method to charge the plurality of batteries 20 connected in parallel is described referring to the first charger 70 as an example, the plurality of batteries 20 may be connected in parallel also when being charged by the second charger 80A. In this case as well, the master battery 20(M) may determine whether or not to execute the selective charging, based on the individual state information.

Figure 12A:
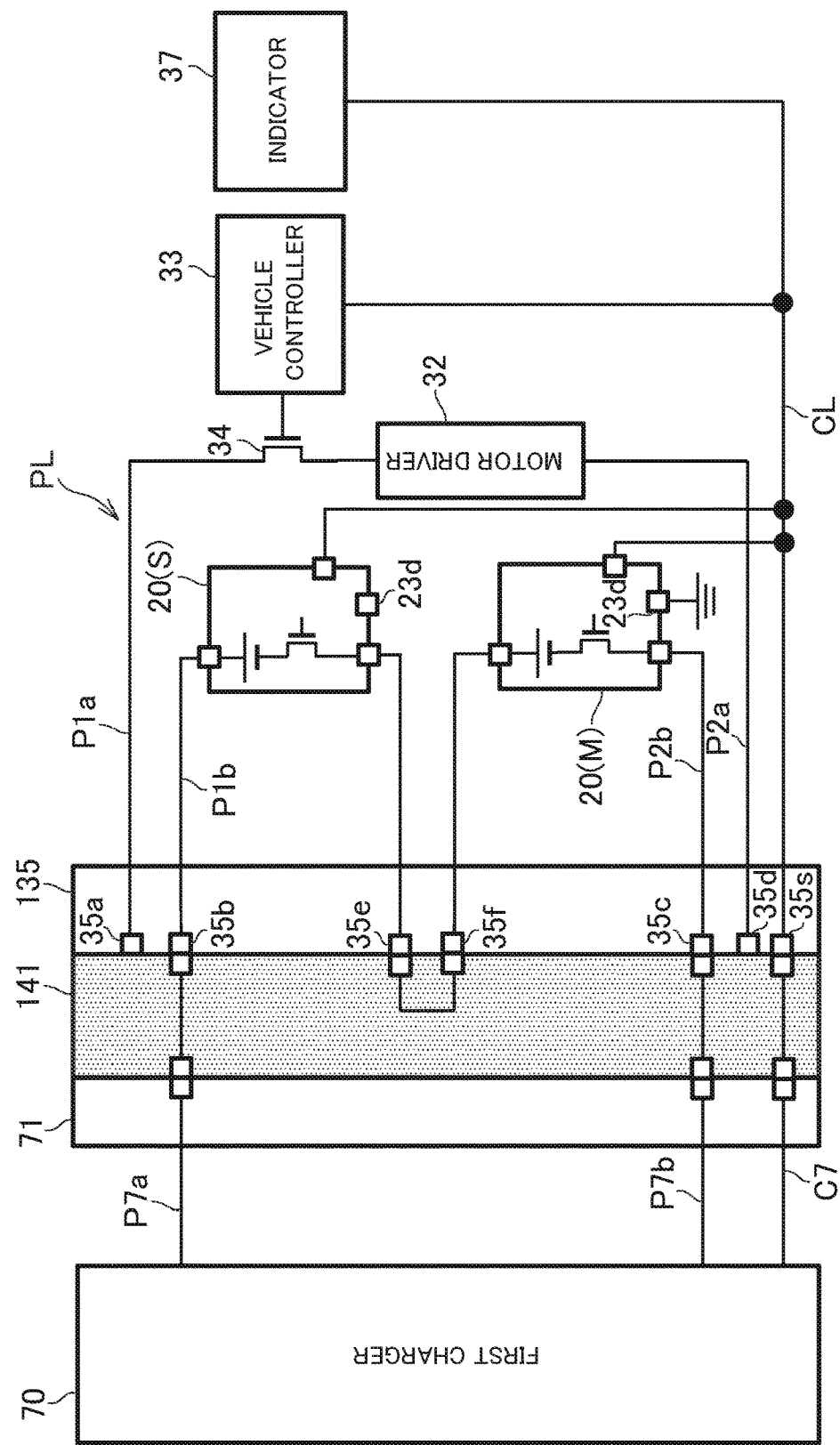
FIG. 12A is a block diagram showing an example of a charging adapter that serially connects a plurality of batteries.
Figure 12B:
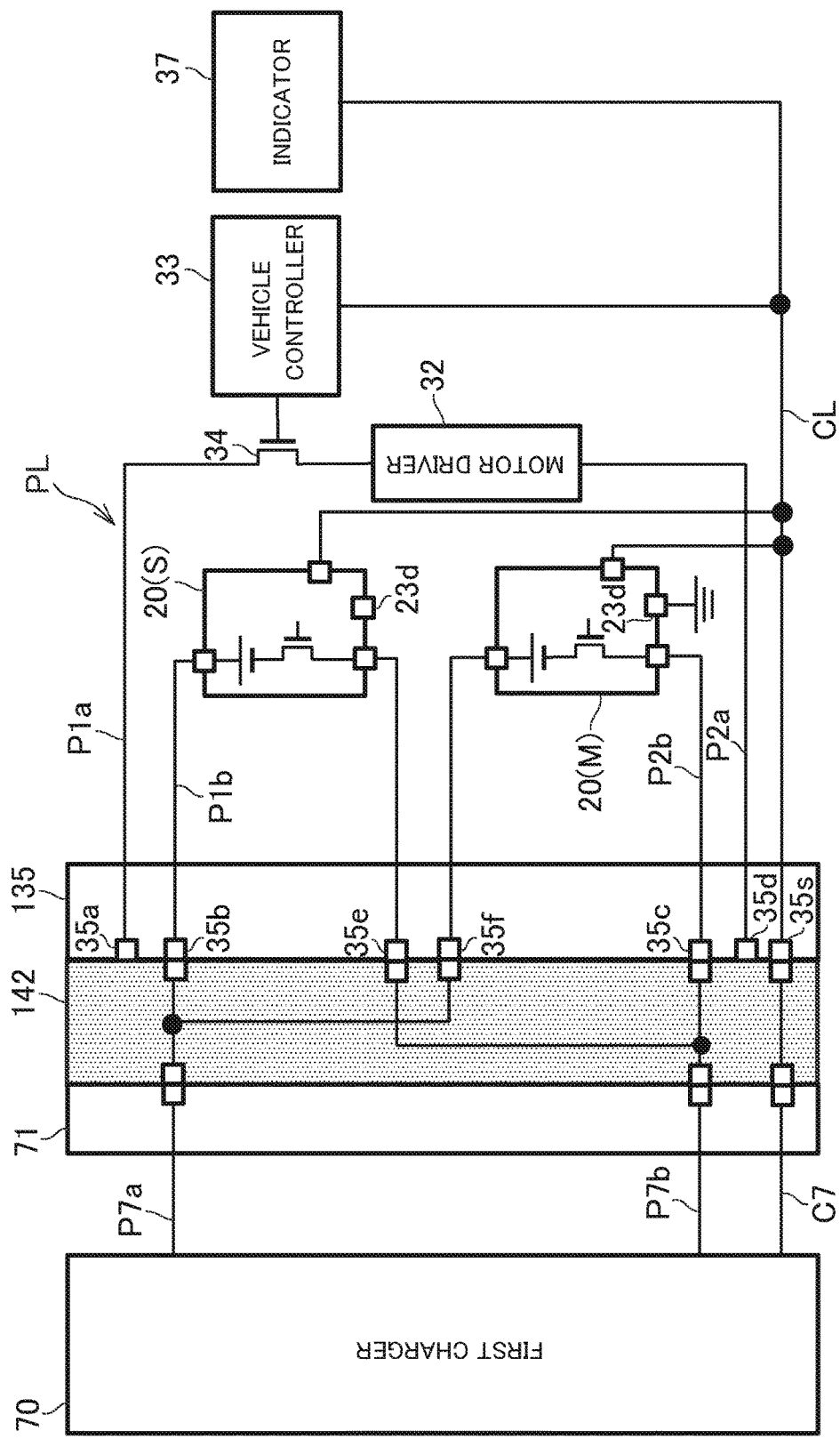
FIG. 12B is a block diagram showing an example of a charging adapter that connects a plurality of batteries in parallel.

In charging a plurality of batteries 20, a charging adapter that enables selection between parallel connection and serial connection of the plurality of batteries 20 may be used. With the above, it is possible to select either parallel connection or serial connection, depending on the period of time available for charging. FIGS. 12A and 12B explain an example of such a charging adapter. FIG. 12A shows a charging adapter 141 that serially connects a plurality of batteries 20, and FIG. 12B shows a charging adapter 142 that connects a plurality of batteries 20 in parallel. These diagrams show a case as an example in which the batteries 20 are charged by the first charger 70.

As described above, the inlet 135 includes the plurality of charging terminals 35*b*, 35*f* connected to the respective positive electrodes of the plurality of batteries 20 and the plurality of charging terminals 35*e*, 35*c* connected to the respective negative electrodes of the same. Each of the charging adapter 141 shown in FIG. 12A and the charging adapter 142 shown in FIG. 12B is able to be removed from the inlet 135. Further, the charging plug 71 of the first charger 70 is removable from the charging adapter 141, 142.

The charging adapter 141 shown in FIG. 12A includes terminals and a line that connects the terminal 35*e* and the charging terminal 35*f* of the inlet 135. With this, the plurality of batteries 20 are serially connected. The charging adapter 141 includes terminals and a line that connects the charging terminal 35*b* of the inlet 135 and the power line P7*a* of the first charger 70, terminals and a line that connects the charging terminal 35*c* of the inlet 135 and the power line P7*b* of the first charger 70, and terminals and a line that connects the communication terminal 35*s* of the inlet 135 and the communication line C7 of the first charger 70. Meanwhile, the charging adapter 142 shown in FIG. 12B includes terminals and a line that connects the terminal 35*b* and the terminal 35*f* of the inlet 135 and the power line P7*a* of the first charger 70, and terminals and a line that connects the terminals 35*e*, 35*c* of the inlet 135 and the power line P7*b* of the first charger 70. With this, the plurality of batteries 20 are connected in parallel. The charging adapter 142 includes terminals and a line that connects the communication terminal 35*s* of the inlet 135 and the communication line C7 of the first charger 70.

Figure 13A:
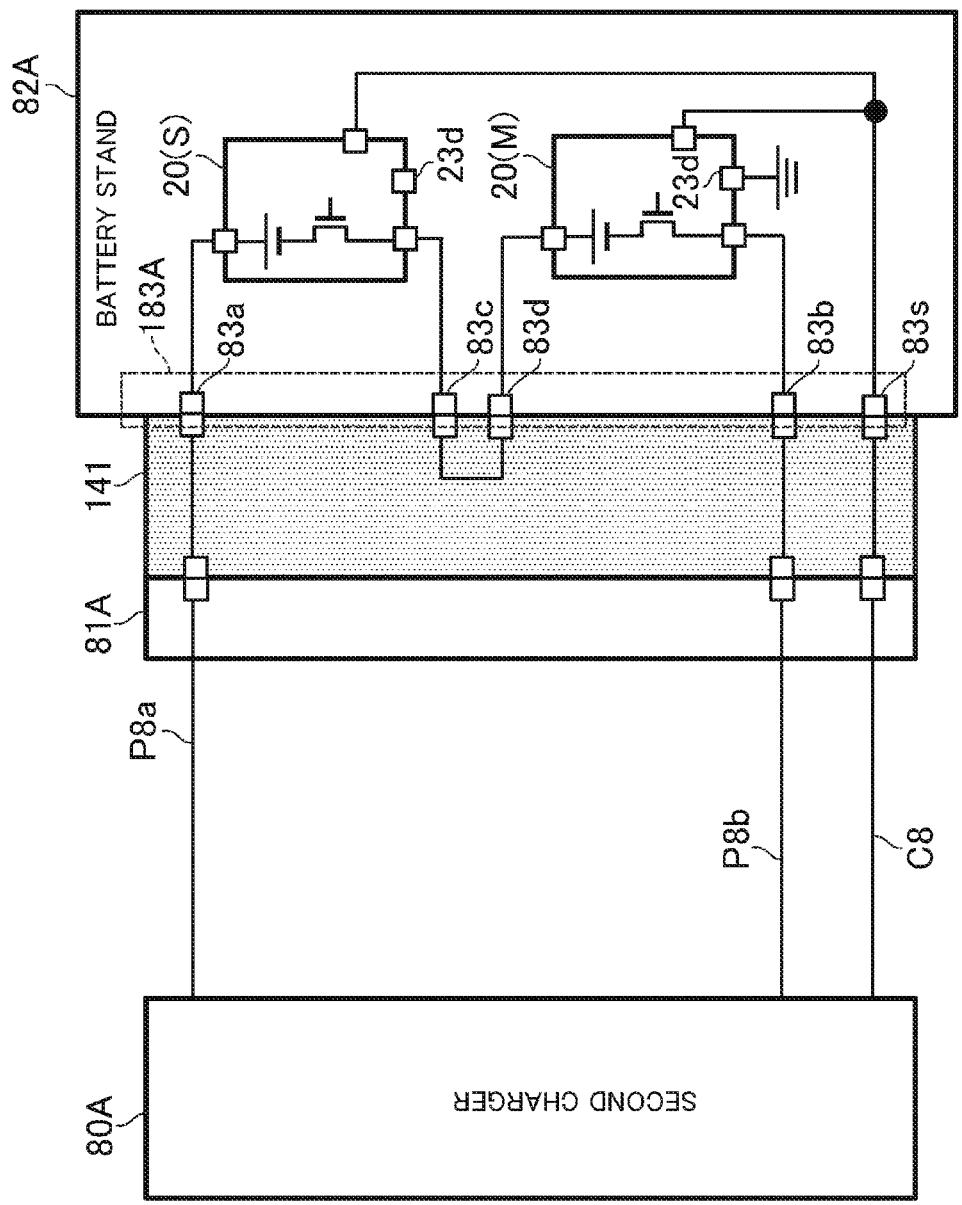
FIG. 13A is a block diagram explaining an example of using the charging adapter shown in FIG. 12A in the second charger.
Figure 13B:
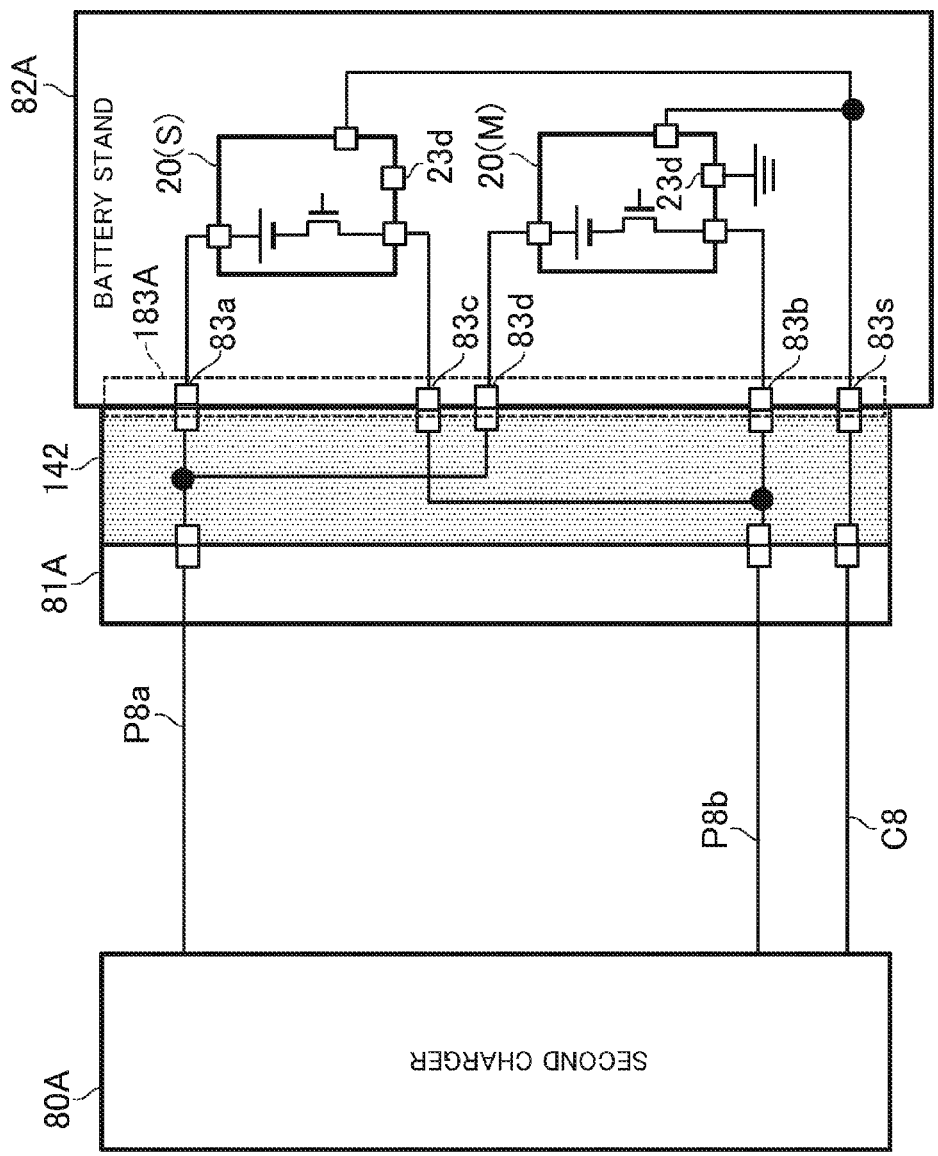
FIG. 13B is a block diagram explaining an example of using the charging adapter shown in FIG. 12B in the second charger.

The above described charging adapters 141, 142 may be used also in charging by the second charger 80A. FIGS. 13A and 13B show an example of the charging adapters 141, 142 and the second charger 80A. In FIG. 13A, a plurality of batteries 20 are serially connected via the charging adapter 141. In FIG. 13B, the plurality of batteries 20 are connected in parallel via the charging adapter 142.

A battery stand 82A of the second charger 80A shown in these diagrams includes a connector 183A. Similar to the inlet 135 provided to the vehicle body, the connector 183A includes a plurality of charging terminals 83*a*, 83*d* connected to the respective positive electrodes of the plurality of batteries 20 and a plurality of charging terminals 83*c*, 83*b* connected to the respective negative electrodes of the plurality of batteries 20. Each of the charging adapter 141 shown in FIG. 13A and the charging adapter 142 shown in FIG. 13B is removable from the connector 183A. The charging plug 81A of the second charger 80A is removable from the charging adapters 141, 142.

The charging adaptor 141 shown in FIG. 13A includes terminals and a line that connects the terminals 83*c*, 83*d* of the connector 183A. With the above, the plurality of batteries 20 are serially connected. Further, the charging adapter 141 includes terminals and a line that connects the charging terminal 83*a* of the connector 183A and the power line P8*a* of the second charger 80A, terminals and a line that connects the charging terminal 83b of the connector 183A and the power line P8b of the second charger 80, and terminals and a line that connects the communication terminal 83s of the connector 183A and the communication line C8 of the second charger 80A. Meanwhile, the charging adapter 142 shown in FIG. 13B includes terminals and a line that connects both of the terminals 83a, 83d of the connector 183A to the power line P8a of the second charger 80A, and terminals and a line that connects both of the terminals 83c, 83b of the connector 183A to the power line P8b of the second charger 80A. With the above, the plurality of batteries 20 are connected in parallel. The charging adapter 142 includes terminals and a line that connects the communication terminal 83s of the connector 183A and the communication line C8 of the second charger 80. Note that as shown in FIG. 13B, when the charging adapter 142 for parallel connection is used in the second charger 80A, only some of the plurality of batteries 20 may be mounted on the battery stand 82A and charged.

Figure 14:
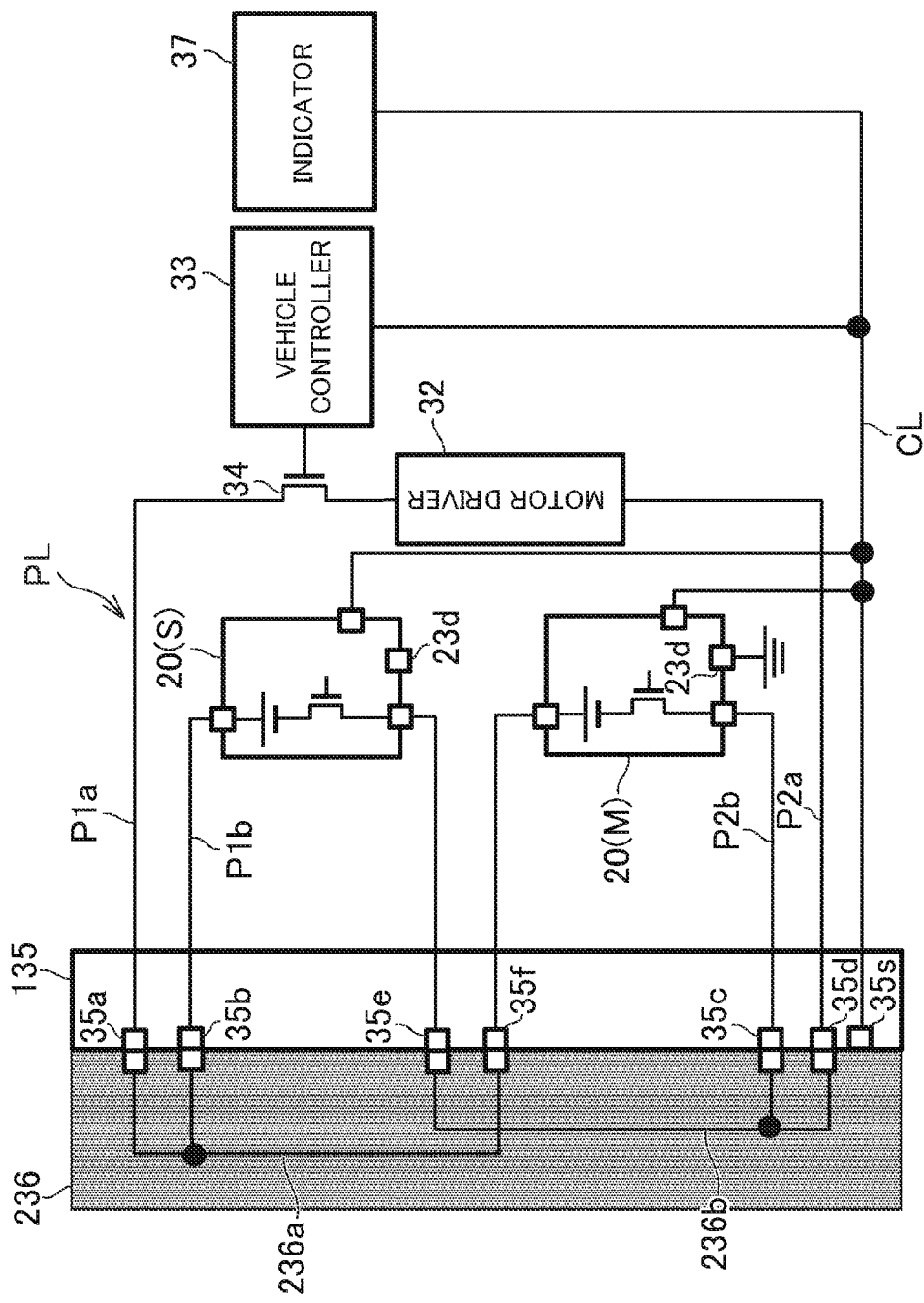
FIG. 14 is a block diagram showing components of a motorcycle including a plurality of batteries connected in parallel.

The plurality of batteries 20 may be connected in parallel also when the vehicle is running. This manner of connection provides a motorcycle with a long travel range. FIG. 14 is a block diagram showing components of a motorcycle in which the plurality of batteries 20 are connected in parallel. In the example shown in this diagram, an inlet cover 236 is attached to the inlet 135. The inlet cover 236 includes a line that connects the plurality of batteries 20 in parallel. In detail, the inlet cover 236 includes a line 236a that connects the charging terminals 35a, 35b, 35f provided to the inlet 135 and a line 236b that connects the charging terminals 35e, 35c, 35d.

Figure 15:
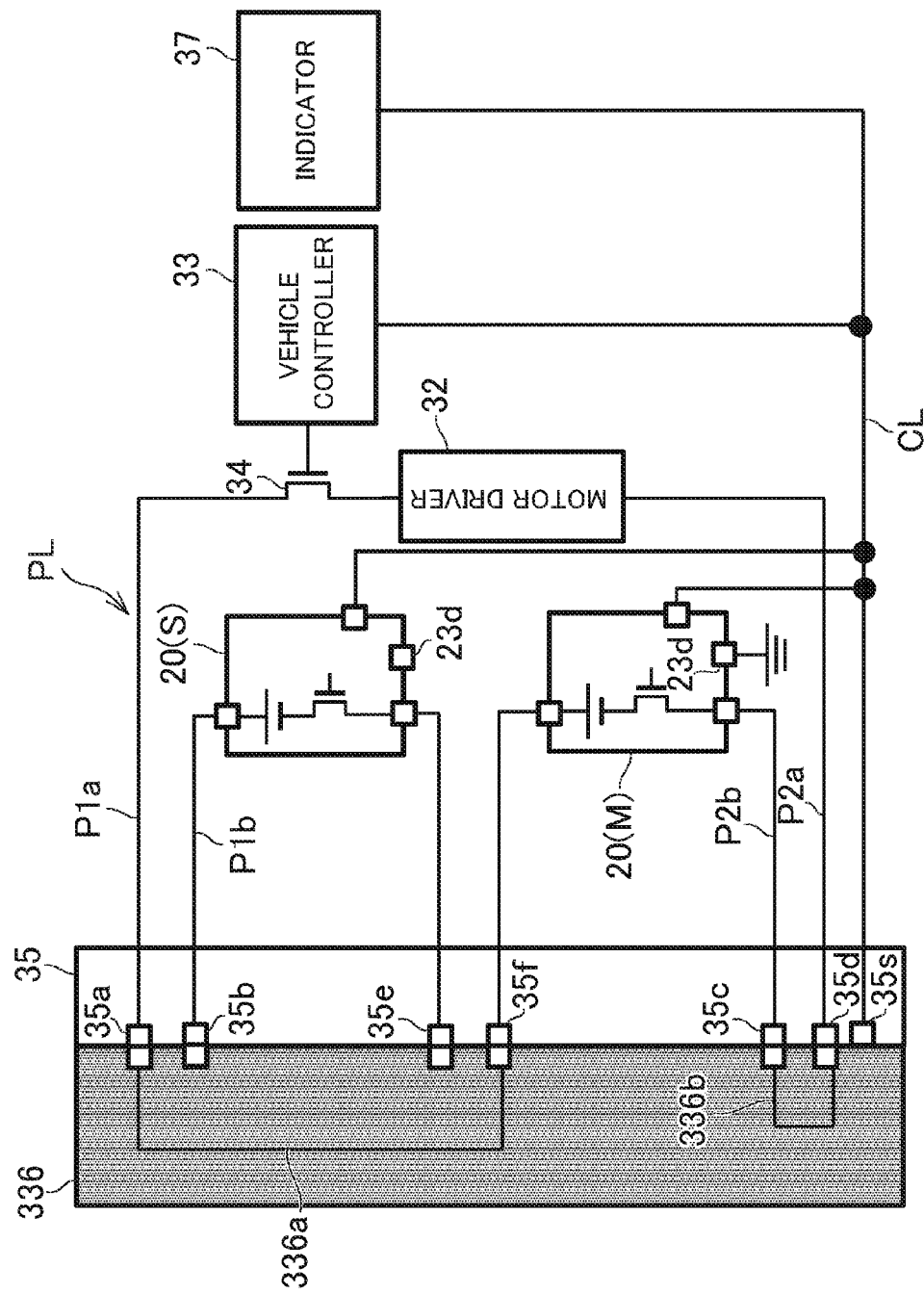
FIG. 15 is a block diagram showing components of a motorcycle with some of a plurality of batteries connected to a motor driver.

When a vehicle is running, the plurality of batteries 20 may be selectively connected to the motor driver 32. That is, only some of the plurality of batteries 20 may be connected to the motor driver 32. FIG. 15 is a block diagram showing components of a motorcycle adapted to this manner of connection of the plurality of batteries 20. In the example shown in the diagram, an inlet cover 336 is attached to the inlet 135. The inlet cover 336 includes a line that connects only some of the plurality of batteries 20 to the motor driver 32. In detail, the inlet cover 336 includes a line 336a that connects the charging terminals 35a, 35f provided to the inlet 135 and a line 336b that connects the charging terminals 35c, 35d. With the above, only one of the two batteries 20 is connected to the motor driver 32, while the other is separated from the motor driver 32. When the remaining battery power of one battery 20 is below a threshold, the orientation of the inlet cover 336 is reversed so that the other battery 20 is able to be connected to the motor driver 32. That is, when the orientation of the inlet cover 336 is reversed, the charging terminals 35a, 35b provided to the inlet 135 are connected, and the charging terminals 35e, 35d are able to be connected. Even in the case where the master battery 20(M) is separated from the motor driver 32 and only the slave battery 20(S) is connected to the motor driver 32, the master battery 20(M) may relay communication with the vehicle controller 33.

Figure 16:
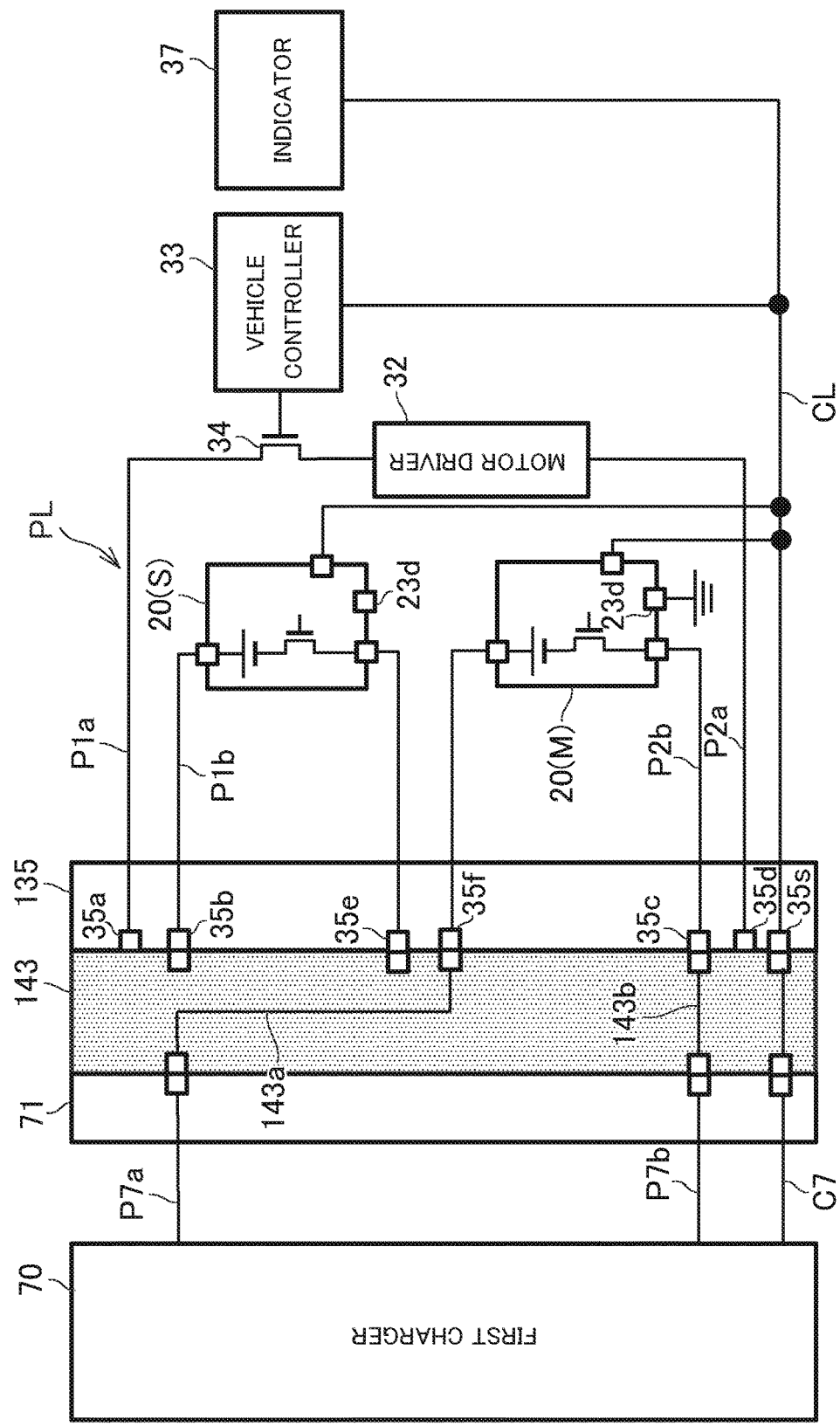
FIG. 16 is a block diagram showing a state in which some of a plurality of batteries are charged by the first charger.

When the battery 20 is charged by the first charger 70, the plurality of batteries 20 may be selectively connected to the first charger 70. That is, only some of the plurality of batteries 20 may be charged. FIG. 16 is a block diagram showing components of a motorcycle adapted to this manner of connection of a plurality of batteries 20. In the example shown in this diagram, the charging adapter 143 is attached to the inlet 135. The charging adapter 143 includes a line that connects some of the plurality of batteries 20 to the first charger 70. In detail, the charging adapter 143 includes a line 143a that connects the charging terminal 35f provided to the inlet 135 and the terminal of the power line P7a provided to the charging plug 71, and a line 143b that connects the charging terminal 35c provided to the inlet 135 and the terminal of the power line P7b provided to the charging plug 71. With the above, only one of the two batteries 20 is connected to the first charger 70, while the other battery 20 is separated from the first charger 70. When charging one battery 20 is completed, the orientation of the charging adapter 143 is reversed so that the other battery 20 is able to be connected to the first charger 70. That is, when the orientation of the charging adapter 143 is reversed, the charging terminal 35b provided to the inlet 135 is able to be connected to the terminal of the power line P7a provided to the charging plug 71, and the charging terminal 35e provided to the inlet 135 is able to be connected to the terminal of the power line P7b provided to the charging plug 71. Even in the case where the master battery 20(M) is separated from the first charger 70 and only the slave battery 20(S) is connected to the first charger 70, the master battery 20(M) may relay communication between the first charger 70 and the slave battery 20(S). This type of charging adapter 143 may be used in charging by the second charger 80A. That is, in the example shown in FIG. 13A, the charging plug 81A of the second charger 80A may be connected to the connector 183A of the battery stand 82A via the charging adapter 143 in place of the charging adapter 141.

The present application claims priority to Japanese Patent Application JP 2015-093315 filed on Apr. 30, 2015, the entire contents of which are hereby incorporated by reference into this application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddled electric vehicle comprising:
    a first battery mountable on and demountable from a vehicle body;
    a second battery mountable on and demountable from the vehicle body independently of the first battery;
    an electric motor driven by power from the first battery and the second battery and that supplies a drive force to a driving wheel;
    an inlet in the vehicle body and capable of being connected to a first charger installed outside; and
    a power line that charges both of the first battery and the second battery with power supplied via the inlet in a state in which the first battery and the second battery are mounted on the vehicle body; wherein
    the first battery includes a first connector capable of being connected to a second charger pre-installed outside the vehicle in a state in which the first battery is demounted from the vehicle body, and a first controller configured or programmed to control charging by the second charger in a state in which the first battery is demounted from the vehicle body; and
    the second battery includes a second connector capable of being connected to the second charger in a state in which the second battery is demounted from the vehicle body, and a second controller configured or programmed to control charging by the second charger in a state in which the second battery is demounted from the vehicle body.

2. A straddled electric vehicle comprising:
a first battery mountable on and demountable from a vehicle body;
a second battery mountable on and demountable from the vehicle body independently of the first battery;
an electric motor driven by power from the first battery and the second battery and that supplies a drive force to a driving wheel;
an inlet in the vehicle body and capable of being connected to a first charger installed outside; and
a power line that charges both of the first battery and the second battery with power supplied via the inlet in a state in which the first battery and the second battery are mounted on the vehicle body; wherein
the first battery includes a first connector capable of being connected to a second charger in a state in which the first battery is demounted from the vehicle body, and a first controller configured or programmed to control charging by the second charger;
the second battery includes a second connector capable of being connected to the second charger in a state in which the second battery is demounted from the vehicle body, and a second controller configured or programmed to control charging by the second charger;
one of the first battery and the second battery defines and functions as a master battery that communicates with the first charging device, based on information on a state of the one of the first battery and the second battery and information on a state of another of the first battery and the second battery, when being mounted on the vehicle body; and
the other of the first battery and the second battery defines and functions as a slave battery that sends the information on the state of the other of the first battery and the second battery to the master battery when being mounted on the vehicle body.

3. The straddled electric vehicle according to claim 2, wherein the master battery sends a request received from the first charger to the slave battery.

4. A straddled electric vehicle comprising:
a first battery mountable on and demountable from a vehicle body;
a second battery mountable on and demountable from the vehicle body independently of the first battery;
an electric motor driven by power from the first battery and the second battery and that supplies a drive force to a driving wheel;
an inlet in the vehicle body and capable of being connected to a first charger installed outside; and
a power line that charges both of the first battery and the second battery with power supplied via the inlet in a state in which the first battery and the second battery are mounted on the vehicle body; wherein
the first battery includes a first connector capable of being connected to a second charger in a state in which the first battery is demounted from the vehicle body, and a first controller configured or programmed to control charging by the second charger;
the second battery includes a second connector capable of being connected to the second charger in a state in which the second battery is demounted from the vehicle body, and a second controller configured or programmed to control charging by the second charger;
one of the first battery and the second battery defines and functions as a master battery that integrates information on a state of the one of the first battery and the second battery and information on a state of the other of the first battery and the second battery and sends information obtained by integration to a controller of the vehicle, when being mounted on the vehicle body; and
the other of the first battery and the second battery defines and functions as a slave battery to send the information on the state of the other of the first battery and the second battery to the master battery, when being mounted on the vehicle.

5. The straddled electric vehicle according to claim 4, wherein the master battery sends a request received from the controller of the vehicle to the slave battery.

6. The straddled electric vehicle according to claim 2, wherein each of the first controller of the first battery and the second controller of the second battery is capable of working as a controller of the master battery.

7. The straddled electric vehicle according to claim 1, wherein the first battery and the second battery supply power to the electric motor when serially connected to each other.

8. The straddled electric vehicle according to claim 1, wherein the first battery and the second battery supply power to the electric motor when connected in parallel to each other.

9. The straddled electric vehicle according to claim 1, wherein the first battery and the second battery are serially connected to each other to be charged.

10. The straddled electric vehicle according to claim 1, wherein the first battery and the second battery are connected in parallel to each other to be charged.

11. The straddled electric vehicle according to claim 10, wherein at least one of the first battery and the second battery selects a battery to be charged based on information on a state of the first battery and information on a state of the second battery.

12. The straddled electric vehicle according to claim 1, wherein the inlet includes four terminals respectively connected to a positive electrode of the first battery, a negative electrode of the first battery, a positive electrode of the second battery, and a negative electrode of the second battery.

13. The straddled electric vehicle according to claim 12, wherein
the inlet includes a cover removable from the inlet; and
the cover includes either a line that serially connects the first battery and the second battery or a line that connects the first battery and the second battery in parallel.

14. A charging system comprising:
the straddled electric vehicle according to claim 1; and
one of the first charger and the second charger.

15. The charging system according to claim 14, wherein
the inlet includes four terminals respectively connected to
a positive electrode of the first battery, a negative electrode of the first battery, a positive electrode of the second battery, and a negative electrode of the second battery;
the first charger includes a charging plug to be connected to the inlet of the straddled electric vehicle; and
the charging plug includes either a line that serially connects the first battery and the second battery or a line that connects the first battery and the second battery in parallel.

16. The straddled electric vehicle according to claim 1, wherein the first battery includes a first housing in which the first connector is exposed outside the first housing, and the second battery includes a second housing in which the second connector is exposed outside the second housing.

17. The straddled electric vehicle according to claim 1, wherein, when the first battery and the second battery are mounted on the vehicle body, the first connector of the first battery and the second connector of the second battery are each connected to a receptacle on the vehicle body.

* * * * *